US012078715B2

(12) United States Patent
Schiffmann et al.

(10) Patent No.: US 12,078,715 B2
(45) Date of Patent: Sep. 3, 2024

(54) RADAR TRACKING WITH MODEL ESTIMATES AUGMENTED BY RADAR DETECTIONS

(71) Applicant: Aptiv Technologies AG, Schaffhausen (CH)

(72) Inventors: Jan K. Schiffmann, Newbury Park, CA (US); David Aaron Schwartz, Moorpark, CA (US); Susan Yu-Ping Chen, Los Angeles, CA (US); Nianxia Cao, Oak Park, CA (US)

(73) Assignee: Aptiv Technologies AG, Schaffhausen (CH)

( * ) Notice: Subject to any disclaimer, the term of this patent is extended or adjusted under 35 U.S.C. 154(b) by 119 days.

(21) Appl. No.: 17/649,794

(22) Filed: Feb. 2, 2022

(65) Prior Publication Data
US 2022/0308198 A1 Sep. 29, 2022

Related U.S. Application Data

(60) Provisional application No. 63/265,189, filed on Dec. 9, 2021, provisional application No. 63/166,108, filed on Mar. 25, 2021.

(51) Int. Cl.
*G01S 13/66* (2006.01)
*G01S 13/87* (2006.01)
*G01S 13/931* (2020.01)

(52) U.S. Cl.
CPC ............ *G01S 13/66* (2013.01); *G01S 13/878* (2013.01); *G01S 13/931* (2013.01); *G01S 2013/93271* (2020.01)

(58) Field of Classification Search
CPC ...... G01S 13/66; G01S 13/878; G01S 13/931; G01S 2013/93271

(Continued)

(56) References Cited

U.S. PATENT DOCUMENTS 6,873,251 B2   3/2005  Schiffmann et al.
7,026,979 B2 * 4/2006  Khosla ................. G01S 13/726
                                                            342/195

(Continued)

FOREIGN PATENT DOCUMENTS

DE  102013011239 A1  1/2015
WO    2020113160 A2  6/2020

(Continued)

OTHER PUBLICATIONS

"Extended European Search Report", EP Application No. 20187674.5, Dec. 4, 2020, 11 pages.

(Continued)

*Primary Examiner* — Zhen Y Wu
(74) *Attorney, Agent, or Firm* — Harness, Dickey & Pierce, P.L.C.

(57) ABSTRACT

This document describes radar tracking with model estimates augmented by radar detections. An example tracker analyzes information derived using radar detections to enhance radar tracks having object measurements estimated from directly analyzing data cubes with a model (e.g., a machine-learning model). High-quality tracks with measurements to objects of importance can be quickly produced with the model. However, the model only estimates measurements for classes of objects its training or programming can recognize. To improve estimated measurements from the model, or even in some cases, to convey additional classes of objects, the tracker separately analyzes detections. Detections that consistently align to objects recognized by the model can update model-derived measurements conveyed initially in the tracks. Consistently observed detections that do not align to existing tracks may be used to establish new tracks for conveying more classes of objects than the model can recognize.

19 Claims, 12 Drawing Sheets

(58) Field of Classification Search
USPC .......................................................... 340/436
See application file for complete search history.

(56) References Cited

U.S. PATENT DOCUMENTS

| | | | |
|---|---|---|---|
| 9,240,053 B2* | 1/2016 | Mathews | G01S 13/726 |
| 9,983,301 B2 | 5/2018 | Liu et al. | |
| 10,451,712 B1* | 10/2019 | Madhow | G01S 13/723 |
| 11,852,746 B2* | 12/2023 | Harrison | G01S 13/42 |
| 2005/0001759 A1* | 1/2005 | Khosla | G01S 13/726 |
| | | | 342/195 |
| 2012/0056772 A1 | 3/2012 | Jaffer et al. | |
| 2013/0006577 A1* | 1/2013 | Mathews | G06T 7/277 |
| | | | 702/150 |
| 2015/0198711 A1* | 7/2015 | Zeng | G01S 13/9029 |
| | | | 342/59 |
| 2016/0103214 A1 | 4/2016 | Clark et al. | |
| 2018/0082137 A1 | 3/2018 | Melvin et al. | |
| 2018/0120429 A1* | 5/2018 | Bialer | G01S 7/415 |
| 2018/0261095 A1* | 9/2018 | Qiu | H04W 4/023 |
| 2018/0275265 A1* | 9/2018 | Bilik | G01S 13/723 |
| 2018/0356498 A1 | 12/2018 | Stachnik et al. | |
| 2019/0107615 A1 | 4/2019 | Eljarat et al. | |
| 2019/0120955 A1* | 4/2019 | Zhong | B60R 11/04 |
| 2020/0175315 A1* | 6/2020 | Gowaikar | G01S 7/417 |
| 2020/0333455 A1* | 10/2020 | Longman | G06F 17/14 |
| 2021/0103027 A1* | 4/2021 | Harrison | G01S 7/40 |
| 2021/0389420 A1 | 12/2021 | Roger et al. | |
| 2022/0196798 A1 | 6/2022 | Chen et al. | |
| 2022/0283288 A1 | 9/2022 | Yu et al. | |
| 2023/0046274 A1* | 2/2023 | Chen | G01S 7/417 |
| 2023/0139751 A1* | 5/2023 | Sanderovich | G01S 13/89 |
| | | | 382/103 |

FOREIGN PATENT DOCUMENTS

| | | |
|---|---|---|
| WO | 2020113166 A2 | 6/2020 |
| WO | 2020146428 A1 | 7/2020 |

OTHER PUBLICATIONS

"Frequency-Modulated Continuous-Wave Radar (FMCW Radar)", Retrieved at: https://www.radartutorial.eu/02.basics/Frequency%20Modulated%20Continuous%20Wave%20Radar.en.html—on Jul. 23, 2021, 6 pages.

Adavanne, et al., "Direction of Arrival Estimation for Multiple Sound Sources Using Convolutional Recurrent Neural Network", Aug. 5, 2018, 6 pages.

Bengtsson, "Models for tracking in automotive safety systems", Licentiate thesis, 2008, Jan. 2008, 189 pages.

Bialer, et al., "Performance Advantages of Deep Neural Networks for Angle of Arrival Estimation", Feb. 17, 2019, 5 pages.

Brooks, et al., "Complex-valued neural networks for fully-temporal micro-Doppler classification", Jun. 2019, 10 pages.

Kellner, "Instantaneous Full-Motion Estimation of Arbitrary Objects using Dual Doppler Radar", Jun. 2014, 6 pages.

Kellner, et al., "Tracking of Extended Objects with High Resolution Doppler Radar", Dec. 2015, 13 pages.

Krim, "Two Decades of Array Signal Processing Research: The Parametric Approach", Jul. 1996, pp. 67-94.

Liu, et al., "Direction-of-Arrival Estimation Based on Deep Neural Networks With Robustness to Array Imperfections", Oct. 2018, 13 pages.

Schlichenmaier, et al., "Clustering of Closely Adjacent Extended Objects in Radar Images using Velocity Profile Analysis", Apr. 2019, 5 pages.

Schlichenmaier, et al., "Instantaneous Actual Motion Estimation with a Single High-Resolution Radar Sensor", Apr. 2018, 5 pages.

Swindlehurst, et al., "Application Of Music To Arrays With Multiple Invariances", Jun. 2000, pp. 3057-3060.

"Extended European Search Report", EP Application No. 22159342.9, Aug. 26, 2022, 9 pages.

"Extended European Search Report", EP Application No. 22159816.2, Aug. 29, 2022, 8 pages.

U.S. Appl. No. 17/644,464, filed Dec. 15, 2021.

\* cited by examiner

RADAR TRACKING WITH MODEL ESTIMATES AUGMENTED BY RADAR DETECTIONS

CROSS-REFERENCE TO RELATED APPLICATION

This application claims the benefit under 35 U.S.C. 119(e) of U.S. Provisional Application No. 63/166,108, filed Mar. 25, 2021, and U.S. Provisional Application No. 63/265,189, filed Dec. 9, 2021, the disclosure of each of which is hereby incorporated by reference in its entirety herein.

BACKGROUND

A perception system for a vehicle (e.g., advanced safety or automated driving system) may rely on an output from a radar tracker. A radar tracker for a multiple-input-multiple-output (MIMO) radar system may output radar tracks to objects derived from analysis of complex radar data (e.g., data cubes, detection lists) that characterizes radar returns detected with a MIMO array, over multiple frames. To improve responsiveness and speed in reporting tracks, a radar tracker may evaluate only a portion of the radar data while ignoring the rest. For example, a model based tracker may quickly recognize specific classes of objects (e.g., cars, trucks) by focusing only on certain parts of a data cube to look only for certain object types. A conventional tracker may analyze detections that are inferred from most if not all the data cube, however, even some detections are not considered (e.g., eliminated, treated as noise). A perception system that relies on a radar tracker tuned for speed or for recognizing only certain classes of objects may fail to provide adequate situational awareness to a vehicle in many common driving scenarios, where other classes of objects are often present but unreported and/or untracked.

SUMMARY

This document describes techniques and systems for radar tracking with model estimates augmented by radar detections. In one example, a method includes establishing, by a radar system, a track to an object in an environment using information obtained from a model, the information obtained from the model including object measurements estimated from a radar data cube representation of signals received from the environment; determining, apart from the information obtained from the model, whether a radar detection observed from the signals received from the environment corresponds to a same object as the track established using the information obtained from the model; and responsive to determining that the radar detection corresponds to the same object as the track established using the information obtained from the model, augmenting, using additional information derived from the radar detection, part of the track initialized according to the object measurements obtained from the model to improve accuracy or detail associated with that part of track.

In some examples, the method includes maintaining a primary tracking layer using the information obtained from the model, the primary tracking layer including the track to the object established using the information obtained from the model in addition to any other tracks established using the information obtained from the model; and maintaining a secondary tracking layer using the additional information derived from the radar detection, the additional information derived from the other radar detection, and additional information derived from any other radar detections apart from using the information obtained from the model, the secondary tracking layer including a track established using the additional information derived from the radar detection, the other track established using the additional information derived from the other radar detection, and any other tracks established using additional information derived from any other radar detections.

In another example, a method includes tracking, using a combination of a model based radar tracker and a detection based radar tracker, objects in an environment of a vehicle based on signals received form the environment, the tracking including: maintaining a primary tracking layer including tracks established using information obtained from a model including object measurements estimated from a radar data cube representation of the signals received from the environment; and maintaining a secondary tracking layer including tracks established using additional information derived, apart from the model, from radar detections identified from the signals received in the environment; and refraining from outputting any of the tracks from the second tracking layer until the additional information derived from radar detections satisfies a quality threshold for performing detection based augmentation of parts of the tracks in the primary tracking layer, outputting the tracks in the primary tracking layer to enable the vehicle to avoid the objects when driving in the environment.

Through implementation of these and other examples contemplated by this disclosure, efficient and accurate radar processing can be achieved to track a wider variety of objects than can be tracked using other radar tracking techniques. This Summary introduces simplified concepts for radar tracking with model estimates augmented by radar detections, for example, vehicles (e.g., trucks, automobiles) equipped with radar tracking to support driving, as well as other examples of object tracking, as further made clear from the Detailed Description and Drawings. This Summary is not intended to identify essential features of the claimed subject matter, nor is it intended for use in determining the scope of the claimed subject matter.

BRIEF DESCRIPTION OF THE DRAWINGS

The details of radar tracking with model estimates augmented by radar detections are described in this document with reference to the Drawings that may use same numbers to reference like features and components, and hyphenated numbers to designate variations of these like features and components. The Drawings are organized as follows:

FIG. 3-1 to FIG. 3-4 illustrate example systems configured to perform radar tracking with model estimates augmented by radar detections;

FIG. 4 illustrates an example system configured to maintaining multiple tracking layers in furtherance of radar tracking, such as to support radar tracking with model estimates augmented by radar detections;

FIGS. 6-1 and 6-2 illustrate additional flow diagrams showing in greater detail, portions of an example process for radar tracking with model estimates augmented by radar detections;

DETAILED DESCRIPTION

Introduction

Figure 1:
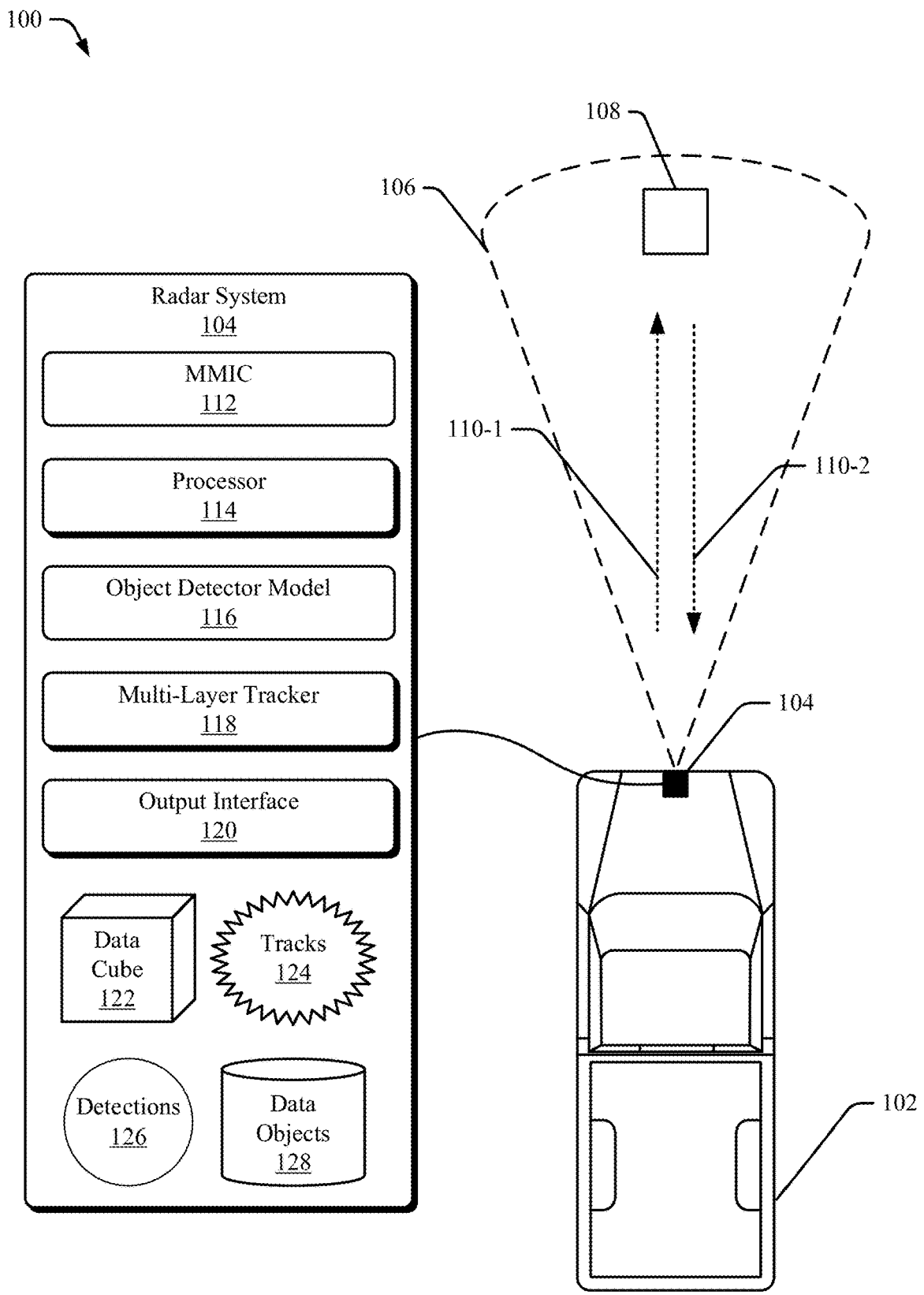
FIG. 1 illustrates an example environment for radar tracking with model estimates augmented by radar detections.

A perception system may rely on a radar tracker to provide situational awareness and detect objects of interest in an environment of a vehicle. The radar system includes a multiple-input-multiple-output (MIMO) antenna array that interfaces to a monolithic-microwave-integrated-circuit (MMIC), which obtains radar returns reflecting from objects detected by the MIMO and conveys those returns as radar data. From the radar data output by the MMIC for a frame, a radar processor can identify lists of detections for that frame. Each detection contains information for deriving a position and range rate of a radar-reflective portion of an object.

A detection based radar tracker can deduce object measurements for an entire object (e.g., position, size, orientation, velocity, acceleration) based on detections to small parts of the object. Some detections (e.g., deemed to be noise, deemed to be too low energy) may be discarded to reduce the amount of radar data being processed; this can include applying thresholding and/or applying non-maximal suppression of energy attributed to the detections, for example by peak finding in a Range-Doppler plane. This may increase tracking speed and cause tracks to objects with object measurements to appear in a radar output more quickly; this is a result of focusing on the detections that remain. Aperiodic sequence of radar tracks, including object measurements, is output in response to grouping detections that can be attributed to a same object. Each of the radar tracks represents a distinct object from a set of objects that are observable from grouping the detections. Each radar track has numerous fields for conveying object measurements; some fields may go unused until an object measurement associated with an object can be deduced from a subsequent frame of detections.

Some radar processors transform the output of the MMIC into a more detailed representation of the radar returns than is represented by lists of detections. The output of the MMIC may be transformed into data structures referred to as data cubes. A data cube organizes radar data obtained from a MIMO array for individual frames, into a two-dimensional (2D) data cube representation of the radar data, having a range-Doppler plane per each receive channel of the MIMO array. This enables formation of a three-dimensional (3D) data cube representation of the MMIC output into a one-dimensional effective receive array, or a four-dimensional (4D) data cube representation of the MMIC output into a 2D effective receive array. Some radar processors may perform additional processing to the receive channels for including in the data cubes, additionally, 1D angular response measurements (e.g., azimuth or elevation) or 2D angular response measurements (e.g., azimuth and elevation). Detections may be determined apart from forming a data cube, and in some cases, detections are derived from the formation of data cubes. In either case, this is a preprocessing step required before traditional detection based tracking can take place. With advancements in computing technology, model based trackers can instead analyze these complex sets of data cubes directly to recognize certain classes of objects and estimate some object measurements more quickly than can be estimated from using detections.

A model based tracker can track objects by processing data cubes directly, and without analyzing individual detections like a detection based tracker does. For example, a model based tracker may include a machine-learned network that is trained to analyze a sequence of data cubes or sparse subsets thereof, for identifying specific types or classes of objects in an environment, which is only a subset of all potential types and classes. The subset therefore includes objects belonging to a particular class of object that the network is trained to recognize. The model based tracker reports a periodic list of modeled measurements (e.g., a machine-learned network periodically reports a list of machine-learned measurements), which contain estimates of certain properties of entire objects found by the machine-learned network from direct analysis of the data cubes. Some fields of tracks generated by a model based tracker may contain modeled measurements estimated by the machine-learned network.

With more emphasis on tracking directly from data cubes, detections that may otherwise be used to support track generation and measurement estimations are often ignored to ensure tracking occurs quickly. Like how detections are discarded or ignored during detection based tracking, some objects of interest for safely driving in an environment may go untracked and unreported in a radar output even when a complex model is used. This diminishes situational awareness, accuracy, and safety, for sake of high tracking speed. Invariably, portions of radar returns, which may have useful information for radar tracking, are discarded or ignored by existing model and detection based trackers. As such, some existing trackers to fail to convey information that is otherwise derivable from portions of radar returns that are ignored. If relied on for automated driving or advanced safety applications, an inaccurate or incomplete set of radar tracks can cause unsafe, uncomfortable, or erratic driving behavior when relied on by vehicle systems.

Overview

This document describes radar tracking with model estimates augmented by radar detections. An example tracker analyzes information derived using radar detections to enhance radar tracks having object measurements estimated from directly analyzing data cubes with a model (e.g., a machine-learning model). High-quality tracks with measurements to objects of importance can be quickly produced with the model. However, the model only estimates measurements for classes of objects its training or programming can recognize. To improve estimated measurements from the model, or even in some cases, to convey additional classes of objects, the tracker separately analyzes detections. Detections that consistently align to objects recognized by the model can update model-derived measurements conveyed initially in the tracks. Consistently observed detections that do not align to existing tracks may be used to establish new tracks for conveying more classes of objects than the model can recognize.

In this way, the example radar tracker can perform efficient radar tracking to convey, with great accuracy and speed, tracks to a wider variety of objects than can be reported using other radar tracking techniques. With reliance on a model's ability to quickly report objects from data cubes, model estimate augmentation quickly reports tracks to model-identifiable objects that may be of most interest in driving (e.g., vehicles, trucks, buses, motorcycles, bicycles). Without introducing latency in this initial object reporting, model estimate augmentation, in addition, facilitates more accurate object measurement reporting (e.g., velocity) and/or additional object reporting. This may cause safer driving decisions than can be made from reliance on model based radar tracking or detection based radar tracking, alone. Where an endless variety of driving environments and object to be avoided are possible, this high speed improved situational awareness at can prevent vehicle collisions with almost any type of radar detectable object appearing on or near a road, thereby promoting driving safety.

Example Environment

FIG. 1 illustrates an example environment 100 for radar tracking with model estimates augmented by radar detections. In the depicted environment 100, a vehicle 102 travels on a roadway, on or near which a wide variety of objects are free to move and impact driving. Although illustrated as a passenger truck, the vehicle 102 can represent other types of motorized vehicles (e.g., a car, motorcycle, bus, tractor, semi-trailer truck), non-motorized vehicles (e.g., a bicycle), railed vehicles (e.g., a train), watercraft (e.g., a boat), aircraft (e.g., an airplane), spacecraft (e.g., satellite), and the like. The vehicle 102 relies on a perception system, including a radar system 104, for avoiding objects while driving the vehicle 102 among them in the environment 100.

The radar system 104 outputs radar dada, including indications of objects detected in a field of view 106. For example, the radar data may alert advanced safety or autonomous driving systems of the vehicle 102 an object 108 that is in a driving path of the vehicle 102. The radar system 104 can be installed on, mounted to, or integrated with any part of the vehicle 102, such as in a front, back, top, bottom, or side portion of the vehicle 102, a bumper, a side mirror, part of a headlight and/or tail light, or at any other interior or exterior location of the vehicle 102 where object detection using radar is desired. The radar system 104 may include multiple radar devices or multiple radar systems that coordinate to act as a single provider of the field-of-view 106. The radar system 104 is primarily described as a MIMO radar system, however the radar tracking techniques described herein are not necessarily limited only to MIMO radar systems and may be applied for radar tracking in other types of radar systems.

The radar system 104 can include a combination of hardware components and software components executing thereon. For example, a computer-readable storage media (CRM) of the radar system 104 may store machine-executable instructions that, when executed by a processor, cause the radar system 104 to output information about objects detected in the field of view 106. One example combination of hardware and software components of the radar system 104 includes a MMIC 112, at least one processor 114, an object detector model 116, a multi-layer tracker 118, and an output interface 120. The radar system 104 may include other components not shown. For example, for simplicity of the Drawings, an antenna of the radar system 104 is not shown, however, in the radar system 104 is configured to couple or include an antenna, such as a MIMO antenna array.

The MMIC 112 processes radar signals, which may include one or more of: signal mixing for up-conversion of an analog signal to radar frequencies, power amplification of the up-converted signal, and signal routing to an antenna (not shown in FIG. 1) for transmission (e.g., radar signal 110-1). Alternatively or additionally, the MMIC 112 receives a reflection (e.g., radar signal 110-2) by way of the antenna, down-converts the signal to an intermediate frequency (IF) signal, and routes the IF signal to other components (e.g., the radar processor 114) for further processing and analysis.

The MMIC 112 of the radar system 104 includes an interface to an appropriate antenna, and during each frame of time, the MMIC 112 transmits radar signals 110-1 via the antenna to radiate objects in the field of view 106. The MMIC 112 receives radar returns 110-2 via the antenna as reflected versions of the radar signals 110-1 transmitted for that frame. The MMIC 112 transforms the radar returns 110-2 into a digital format enabling the radar system 104 to quickly establish tracks to objects in the field of view 106.

The processor 114, the object detector model 116, the multi-layer tracker 118, and the output interface 120 are configured to process the radar returns 110-2 digitized by the MMIC 112 into various forms of other radar data, some of which is maintained for internal use by the radar system 104, such as a data cube 122, detections 126, and data objects 128. Other forms of radar data are generated for use by other systems of the vehicle 102 (outside the radar system 104), such as one or more tracks 124. Each of the tracks 124 corresponds to a unique object tracked from the radar returns 110-2 obtained from the field of view 106.

For clarity, the environment 100 shows the radar processor 114 as a single processor, but various implementations can include multiple processors. To illustrate, the radar processor 114 may include a signal processor (SP) and a data processor (DP) for different processing tasks. The SP, as one example, performs low-level processing, such as Fast Fourier Transforms (FFTs), identifying targets of interest for the DP, generating a range Doppler map, and so forth, while the DP performs high-level processing, such as tracking, display updates, user interface generation, and so forth. The radar processor 114 processes digital microwave and/or radar signals (e.g., the IF signal). This can include scheduling and configuring radar signal transmissions to create a field-of-view (e.g., the field of view 106) with a particular size, shape, and/or depth. The radar processor 114, for instance, generates digital representations of signal transmissions that are fed into a digital-to-analog converter (DAC) and upconverted to radar frequencies for transmission. In aspects, a DAC (not shown in FIG. 1) may be integrated with the MMIC 112, integrated with the radar processor 114 as part of an SoC, or be included in the radar system 104 as a stand-alone component. Alternatively or additionally, the radar processor 114 receives and processes a digitized version of a reflected radar signal by way of an analog-to-digital converter (ADC), such as a digitized IF signal generated by the MMIC 112 from the radar signal 110-2. In a similar manner to the DAC, an ADC may be integrated with the MMIC 112, integrated with the radar processor 114 as part of an SoC, or be included in the radar system 104 as a stand-alone component.

The processor 114 generates the data cube 122, which represents a collection of measurements related to the digitized radar returns 110-2 obtained from the MMIC 112 during one frame. In this MIMO example, receive channels of the radar system 104 are processed into a 2D (two-dimensional) data cube 122 including a range-Doppler plane per channel, which results in a 3D (three-dimensional) data cube 122 for a 1D (one-dimensional) effective receive antenna array, or a 4D (four-dimensional) data cube 122 for a 2D (two-dimensional) effective receive antenna array. The data cube 122 may also contain other information obtained from further processing, such as information about a particular 1D or 2D angular response (e.g., elevation, azimuth, a combination of elevation and azimuth).

In addition, based on the data cube 122 or based directly on the digitized radar returns 110-2 obtained from the MMIC 112, the processor 114 generates the detections 126. A single detection or group of the detections 126 can indicate a radial range rate to effective radar returns 110-2 (scatters) on the object 108 in the environment 100. The detections 126 may have errors in position (e.g., range, azimuth angle), however, many of the detections 126, with accurate and high-quality radial range rates, can be used to support augmentation object measurements conveyed in some of the tracks 124.

Maintained internal to the radar system 104, the data objects 128 are produced from an analysis of the detections 126 and a separate analysis of the data cube 122. The data objects 128 include two types of data objects referred to as model based data objects and detection based data objects. The data cube 122 is resolved into the data objects 128 that are model based from execution of the object detector model 116. The detections 126 are resolved into the data objects 128 that are detection based, from execution of the multi-layer tracker 118. The data objects 128 are maintained internal to the radar system 104 to enable subsequent generation of the tracks 124. The data objects 128 are different from the tracks 124, which are highly accurate model based representations of objects augmented by radar detections. Rather, the data objects 128 refer to internal representations of objects (or portions of objects) and their respective measurements, which are maintained by the radar system 104 until they can be used to establish or augment the tracks 124.

The data objects 128 that are model based data objects are generated by the object detector model 116 directly from the data cube 122 using a computer model (e.g., a machine-learned network). The object detector model 116 may be any type of computer model that is programmed or trained to apply machine-learning to recognize classes of objects from data cubes. A machine-learned model, such as an artificial neural network, is one type of computer model that can quickly recognize certain classes of objects from complex, multi-dimensional data sets (e.g., the data cube 122), along with estimated measurements for the objects to be used in establishing tracks (e.g., the tracks 124). With reliance on a model, the object detector model 116 is configured (e.g., trained or programmed) to estimate object measurements for certain classes of objects, however, reliance on the model may prevent the object detector model 116 from detecting many objects that are encountered during driving but that the model cannot recognize directly from the data cube 122. The model of the object detector model 116 may analyze a subset of the data cube 122 in its analysis, ignoring for sake of speed, other information that may be derivable from parts of the data cube 122 that are outside the subset being analyzed.

In some examples, the data objects 128 that are model based are generated by the object detector model 116 in a variety of different ways, including using other types of models. The object detector model 116, can be any component or function configured to operate directly on radar data to accurately estimate object measurements, e.g., produce an estimate of object position and extent. For example, the extent may be an oriented bounding box (e.g., as shown in FIG. 4), which is preferred for depicting non-articulated vehicle objects in a driving scene. The object detector model 116 may in some cases, operate directly on the demodulated radar returns 110-2 received from the MMIC 112, or directly on the data cube 122 generated by the processor 114 after further processing the demodulated radar returns 110-2 (e.g., after performing range-Doppler FFT processing, after performing range-Doppler FFT processing and angle processing). The object detector model 116 may operate on one or more radar devices of the radar system 104, and operate across one or more timesteps, frames, durations, or scans of multiple radar devices of the radar system 104.

The multi-layer tracker 118 produces the data objects 128 that are detection based data objects. Derived from the detections 126, e.g., from grouping and analyzing the detections 126 using detection based object tracking techniques, apart from using the object detector model 116, the multi-layer tracker 118 adds to the data objects 128, one or more detection based data objects. Some of the detections 126 (e.g., false detections, noise) may be discarded to reduce complexity/the amount of the detections 126 ultimately processed. Some of the detections 126 may be discarded from applying thresholding and/or from applying non-maximal suppression of the energy attributed to the detections, for example by peak finding in a Range-Doppler plane. The multi-layer tracker 118 may also include in its detection analysis, some of the detections 126 that are attributed to parts of the data cube 122 that the object detector model 116 ignores. Each of the data objects 128 that is detection based can correspond to any radar detectable portion of an object in the field of view 106, whereas each of the model based data objects corresponds to an entire object that is of a particular class or type associated with the model. As such, the data objects 128 may include far more detection based data objects than those that are model based data objects.

As its name implies, the multi-layer tracker 118 manages the data objects 128 conceptually, as multiple layers of internal tracks. One layer includes an internal track referred to as a modeled track for each of the data objects 128 that is model based. The other layer includes an internal track referred to as a detection track for each of the data objects 128 that is detection based. These internal tracks are not output from the radar system 104 and not yet ready for use in establishing the tracks 124 that are eventually output. However, each internal track includes information used to populate fields in the tracks 124, including object measurements, such as, position, movement, or other properties. The multiple layers of internal tracks are provided to the output interface 120, which resolves the model based tracks with the detection based tracks into the tracks 124. While described as being maintained as layers, the internal tracks can be maintained using any suitable data structure for facilitating future alignment and positional comparisons, as is described throughout this disclosure.

The output interface 120 receives the model based tracks and the detection based tracks maintained by the multi-layer tracker 118 to resolve the two types of internal tracks and generate the tracks 124 that are output from the radar system 104. The tracks 124 define position, and other information about an object in the environment 100. The tracks 124 are updated as the radar system 104 captures the radar returns 110-2 over subsequent frames. In general, the output interface 120 causes each of the tracks 124 to include object-level information corresponding to an entire, radar-reflective object in the environment 100. Each of the tracks 124 may have a structure including numerous fields containing various properties estimated for that particular object.

Some of the tracks 124 may define an object based on model estimates alone, which are determined directly from the data cube 122. Eventually, though, some of the tracks 124 are augmented to define the object with further information derived from the detections 126, which serve to improve accuracy or detail of some of the modeled estimates. For example, the output interface 120 outputs the tracks 124 to include one track for each model based track, initially, and refrains from using any of the detection tracks maintained internally. When the model based tracks and/or information derived from the detections 126 satisfies a quality threshold, detection information is used to change information contained in fields of the tracks 124 established initially using model estimates alone. By augmenting the tracks 124 based on the detections 126, accuracy and/or detail of the tracks 124 may be improved.

In some cases, the tracks 124 include convey objects inferred from just the detections 126. In some cases, a quality of a detection based track is sufficient to cause the output interface 120 to include a new track to an object not previously included among the data objects 128 that are model based, or among the existing tracks 124. The tracks 124, including those that are augmented or added new, are output from the output interface 120, which enable the vehicle 102 to avoid objects, including the object 108, when driving in the environment 100.

In this way, the tracks 124 can have accurate and precise tracks on objects recognized by a model, which can also be enhanced by range rates or other information inferred apart from the model, through analyzing the detections 126. The multi-layer tracker 118 can track many objects using detection based radar tracker techniques that are not being reported from the object detector model 116. This may prevent latency in providing radar tracks, which can later be augmented with additional information from the detections, to convey a wide variety of objects with accuracy and speed. Improving accuracy and fidelity of object tracking in this way may result in greater safety for the vehicle 102, and other vehicles and pedestrians that travel in or near a road.

Example Vehicle Configuration

Figure 2:
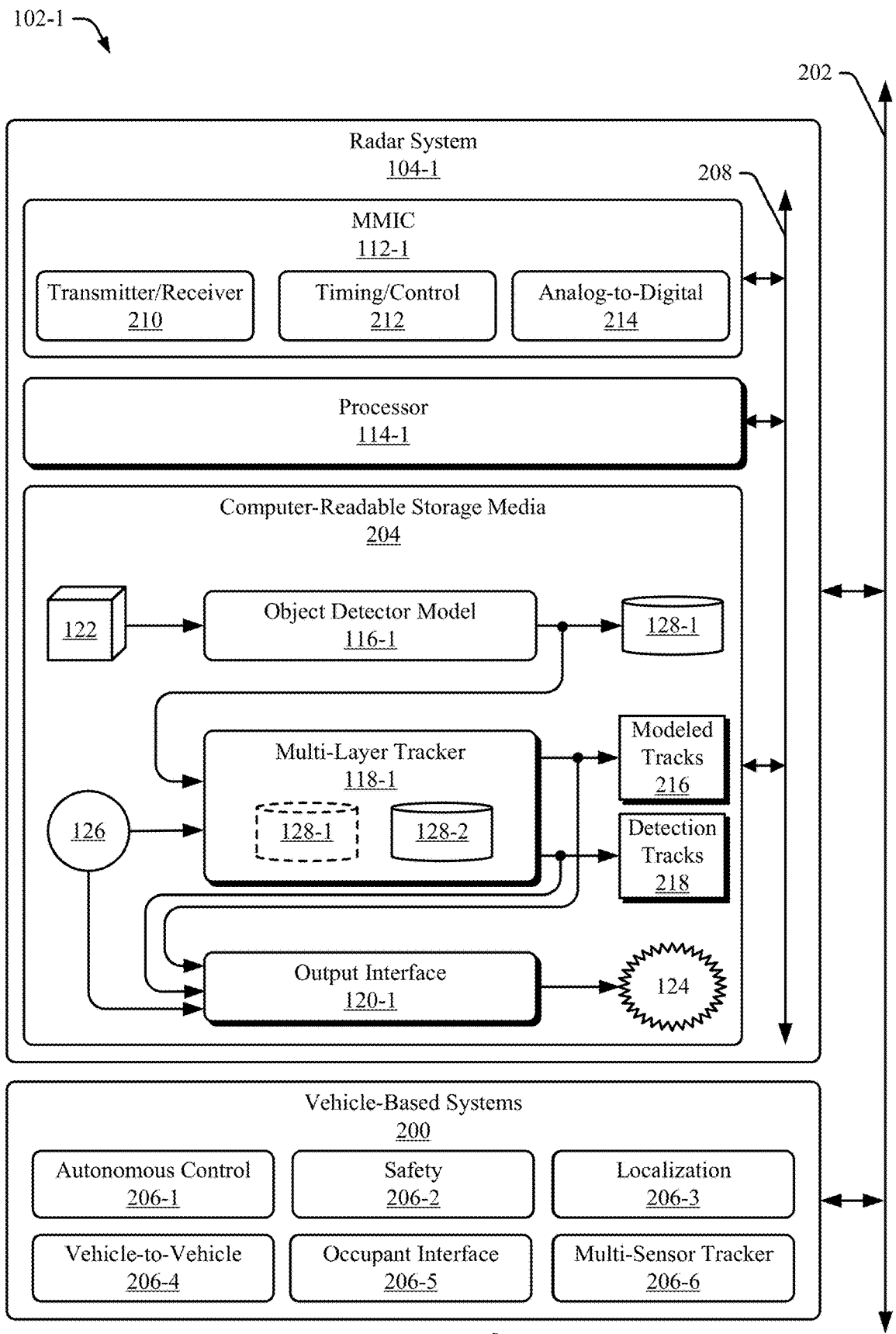
FIG. 2 illustrates an example vehicle including a system configured to perform radar tracking with model estimates augmented by radar detections.

FIG. 2 illustrates an example vehicle 102-1 including a system configured to perform radar tracking with model estimates augmented by radar detections. The vehicle 102-1 is an example of the vehicle 102.

Included in the vehicle 102-1 is a radar system 104-1, which is an example of the radar system 104, shown in greater detail. The vehicle 102-1 also includes vehicle based systems 200 that are operatively and/or communicatively coupled to the radar system 104-1 via link 202, which may be one or more wired and/or wireless links including vehicle-based network communications for interconnecting the components of the vehicle 102-1. In some examples, the link 202 is a vehicle communication bus.

The vehicle-based systems 200 use vehicle data, including radar data provided on the link 202 by the radar system 104-1, to perform vehicle-based functions, which in addition to other functions may include functions for vehicle control. The vehicle-based systems 200 can include any conceivable device, apparatus, assembly, module, component, subsystem, routine, circuit, processor, controller, or the like, that uses radar data to act on behalf of the vehicle 102-1. As some non-limiting examples, the vehicle based systems 200 may include a system for autonomous control 206-1, a system for safety 206-2, a system for localization 206-3, a system for vehicle-to-vehicle communication 206-4, a system for use as an occupant interface 206-5, and a system for use as a multi-sensor tracker 206-6. Upon receipt of the radar data, functions provided by the vehicle-based systems 200 use portions of the radar data, including estimated measurements of objects detected in the field-of-view 106, to configure the vehicle 102-1 to safely drive without colliding with the detected objects.

For example, the tracks 124 are examples of the radar data that is output on the link 202 to the vehicle-based systems 200. One of the tracks 124 can include information about movement of the object 108, such as a velocity, position, and the like, to enable the vehicle-based systems 200 control or assist with braking, steering, and/or accelerating the vehicle 102-1 to avoid a collision with the object 108. The system for autonomous control 206-1 can use the tracks 124 received via the link 202 to autonomously or semi-autonomously drive the vehicle 102-1 safely on a road. The system for use as an occupant interface 206-5 can use the information in the tracks 124 allow an operator or passengers to have situational awareness to make driving decisions or provide operator inputs to a controller for providing more buffer to avoid the objects. The tracks 124 or information contained therein may be provided to other vehicles using the system for vehicle-to-vehicle communication 206-4, to allow operators, passengers, or controllers of other vehicles to also avoid the objects being tracked or have confidence that the vehicle 102-1 is aware of their presence based on receipt of the tracks 124. By improving situational awareness for the vehicle 102-1 and other vehicles in the environment 100, the vehicle 102-1 can drive in a safer manner under manual, autonomous, or semi-autonomous control.

The radar system 104-1 includes a MMIC 112-1, as an example of the MMIC 112. The MMIC 112-1 includes transmitter/receiver elements 210, timing/control elements 212, and analog-to-digital converters 214. For simplicity in the Drawings, omitted from FIG. 2 is an antenna array (e.g., MIMO antenna array) that is also part of the radar system 104-1 and operatively coupled to the transmitter/receiver elements 210.

The transmitter/receiver elements 210 are configured to transmit electromagnetic (EM) signals using one or more components for emitting EM energy. Using one or more components for receiving EM energy, the transmitter/receiver elements 210 are configured to receive reflections in response to objects that reflect the emitted EM energy. The transmitter/receiver element 210 can be configured as a transceiver configured as a single component (e.g., chip) to perform both transmission and reception. For example, the components for emitting EM energy enable the field of view 106 to be radiated by transmitting the radar signals 110-1. The radar returns 110-2 represent reflections of the EM energy radiated with the radar signals 110-1; the components for receiving EM energy enable reception of the radar returns 110-2, which may enable objects to be detected and tracked in the field of view 106.

The timing/control elements 212 perform operations that adjust characteristics of the radar signals 110-1 (e.g., frequency, gain, phase, period) being transmitted, or operations for receiving radar returns 110-2 in a way that is effective for radar tracking using the particular antenna and radar design. For example, the timing/control elements 212 cause the transmitter/receiver elements 210 to adjust a size, a shape, antenna pattern, or other characteristic of the radar system 104-1 to transmit the radar signals 110-1 using multiple transmitters, and multiple receivers to capture more information from the radar returns 110-2 during each frame, enabling radar tracking high-resolution.

The analogue-to-digital converters 214 convert the radar returns 110-2 obtained from the transmitter/receiver elements 210 into a digital format that can be used for generating data cubes, detections, and enable other radar processing. The MMIC 112-1 outputs the digitized radar returns 110-2 over a link 208, which represents an internal communication link between components of the radar system 104-1. The link 208 may be wired or wireless and enables internal representations of radar data (e.g., the data cube 122, the detections 126) to be exchanged within the radar system 104-1 before appearing as the tracks 124 that are output on the link 202.

Operatively coupled to the MMIC 112-1 and the link 208, the radar system 104-1 also includes at least one processor 114-1, which is an example of the processor 114. Some examples of the processor 114-1 include, a controller, a control circuit, a microprocessor, a chip, a system, a system-on-chip, a device, a processing unit, a digital signal processing unit, a graphics processing unit, and a central processing unit. The processor 114-1 can be any component configured to process frames of digitized versions of the radar returns 110-2 obtained from the MMIC 112-1 to convey objects in the environment 100 as information appearing in the tracks 124. The processor 114-1 may include multiple processors, one or more cores, embedded memory storing software or firmware, a cache or any other computer element that enables the processor 114-1 to execute machine-readable instructions for generating the tracks 124.

Machine-readable instructions that are executed by the processor 114-1 can be stored by a computer-readable media (CRM) 204 of the radar system 104-1. The CRM 204 may also be used to store data managed by the processor 114-1 during execution of the instructions. In some examples, the CRM 204 and the processor 114-1 are a single component, such as a system on chip including the CRM 204 configured as a dedicated memory for the processor 114-1. In some examples, access to the CRM 204 is shared by other components of the radar system 104-1 (e.g., the MMIC 112-1) that are connected to the CRM 204, e.g., via the link 208. The processor 114-1 obtains instructions from the CRM 204; execution of the instructions configure the processor 114-1 to perform radar operations, such as radar tracking, which result in communication of the tracks 124 to the vehicle-based systems 200 and other components of the vehicle 102-1 over the link 202.

In this example, the CRM 204 includes instructions for configuring the processor 114-1 to generate the data cube 122, generate the detections 126, and resolve the data cubes 122 and the detections 126 into the tracks 124 by augmenting model estimates that define object measurements conveyed by the tracks 124 with information derived from the detections 126. For example, the CRM 204 includes instructions for executing an object detector model 116-1, which is an example of the object detector model 116. Also included in the CRM 204 are instruction sets, which when executed by the processor 114-1, implement a multi-layer tracker 118-1 and an output interface 120-1, which, respectively, are examples of the multi-layer tracker 118 and the output interface 120.

When executed by the processor 114-1, the object detector model 116-1 receives a sequence of data cubes, including the data cube 122. The object detector model 116-1 outputs model based data objects 128-1, which are a subset of the data objects 128. The model based data objects 128-1 may appear on the link 208 as internal data managed by the processor 114-1 and stored on the CRM 204. The model based data objects 128-1 are each of a particular object class or object type that the object detector model 116-1 is specifically trained or programmed to recognize. The model based data objects 128-1 can include detailed information indicating object class, position, size, and shape; with less accuracy, information about heading and speed (e.g., velocity) is included in the model based data objects 128-1, which is estimated by the object detector model 116-1. Although the object detector model 116-1 may fail to recognize some types of objects, information about the model based data objects 128-1 that are recognized, are maintained by the CRM 204 for use by the multi-layer tracker 118-1 in furtherance of the output interface 120-1 generating the tracks 124.

The multi-layer tracker 118-1 may output two internal sets of tracks to be resolved by the output interface 120-1 for producing the tracks 124. The two sets of tracks output from the multi-layer tracker 118-1 may include modeled tracks 216 and detection tracks 218. Each of the model based data objects 128-1 corresponds to one of the modeled tracks 216. Each of the detection tracks 218 corresponds to one of the data objects 128 that the multi-layer tracker produces internally, referred to as detection based data objects 128-2.

Formed from grouping and analyzing the detections 126, the detection based data objects 128-2 are derived apart from the object detector model 116-1 and the data cube 122. Typically, at least one of the detection based data objects 128-2 corresponds to one of the model based data objects 128-1. However, some detection based data objects 128-2 convey additional objects detectable from the radar returns 110-2 beyond the model based data objects 128-1 that are recognizable to the model of the object detector model 116-1. Because the detection tracks 218 correspond to each of the detection based data objects 128-2, which may be more numerous than the model based data objects 128-1, the detection tracks 218 can include far more tracks than the modeled tracks 216.

The detection tracks 218 can be directed to the detection based data objects 128-2, which can be of any object type or any object class (with a radar reflective surface), whereas the modeled tracks 216 are directed to the model based data objects 128-1, which are limited to object types and object classes recognizable to the model of the object detector model 116-1. The additional detail derivable from the detections 126 is included the detection based data objects 128-2 and conveyed in the detection tracks 218, and therefore, the detection tracks 218 may include information to improve measurements estimated for the model based data objects 128-1, which are already conveyed by the modeled tracks 216.

The output interface 120-1 receives the modeled tracks 216 and the detection tracks 218 from the multi-layer tracker 118-1. In some examples, the detections 126 are an input to the output interface 120-1, as well. From comparing the two sets of tracks 216 and 218, the output interface 120-1 determines whether to use any information from the detection tracks 218 to augment information in any of the modeled tracks 216, or whether to form additional tracks among the tracks 124 based on the detection tracks 218 to convey additional objects beyond those conveyed by the modeled tracks 216, even if augmented by the detections 126.

The details of how the output interface 120-1 resolves the modeled tracks 216 with the detection tracks 218 into the tracks 124 are described in further detail below. The output interface 120-1 takes an overlay approach to resolving the two sets of tracks 216 and 218. The basis of this overlay approach is two-fold.

First, the detections 126, and the detection based data objects 128-2 being used to support the detection tracks 218 typically have these properties: the detections 126 may be reported on any type of radar-reflective object, multiples of the detections 126 can be reported on a single object, multiples of the detections 126 may be reported to be anywhere on an object, and sometimes reported to appear off the object, but near the object. As such, the detection based data objects 128-2 may have significant errors in range or angle (e.g., azimuth), leading to errors in positions attributed to the detection tracks 218. Range rates associated with the detection based data objects 128-2 are typically of high quality when based on the detections 126.

Second, the modeled objects 128-1 typically include measurements estimated by the model of the object detector model 116-1 to have the following properties: object of only certain object types or object classes are reported (e.g., pedestrian, bicycle, car, truck). Nevertheless, the measurements estimated by the model from the data cube 122 are typically of high quality in terms of position and size measurements, and determinations about object class. To less quality, orientation estimates from the model are reported, as well as an inaccurate velocity vector for the object recognized. Given this as our two-fold basis, the output interface 120-1 is configured to identify those desirable aspects of the detection tracks 218 that, when overlaying or corresponding to parts of existing modeled tracks 216, can be used to augment the existing modeled tracks 216, thereby improving accuracy and resolution of the tracks 124.

High quality abilities of the model that processes the data cube 122 to determine object class, position, size, and orientation are fully taken advantage of in tracking model based data objects 128-1. High quality range rates of the detection based data objects 128-2 can be used to augment or enhance the tracks 124 produced from the model based data objects 128-1, for example, to improve the velocity vector or other low-quality measurement estimated by the model. In some cases, this two-fold overlay approach enables the output interface 120-1 to convey all types of radar-detectable objects in the field of view 106 (not just those that are recognizable to the model) by selectively promoting one or more of the detection tracks 218 for inclusion in the tracks 124 on the link 202. By maintaining the modeled tracks 216 separate from the detection tracks 218, the multi-layer tracker 118-1 enables the output interface 120-1 quickly resolve the tracks 124 into a more accurate representation of potential obstacles in the field of view 106.

Example Radar Architectures

Figures 1, 3:
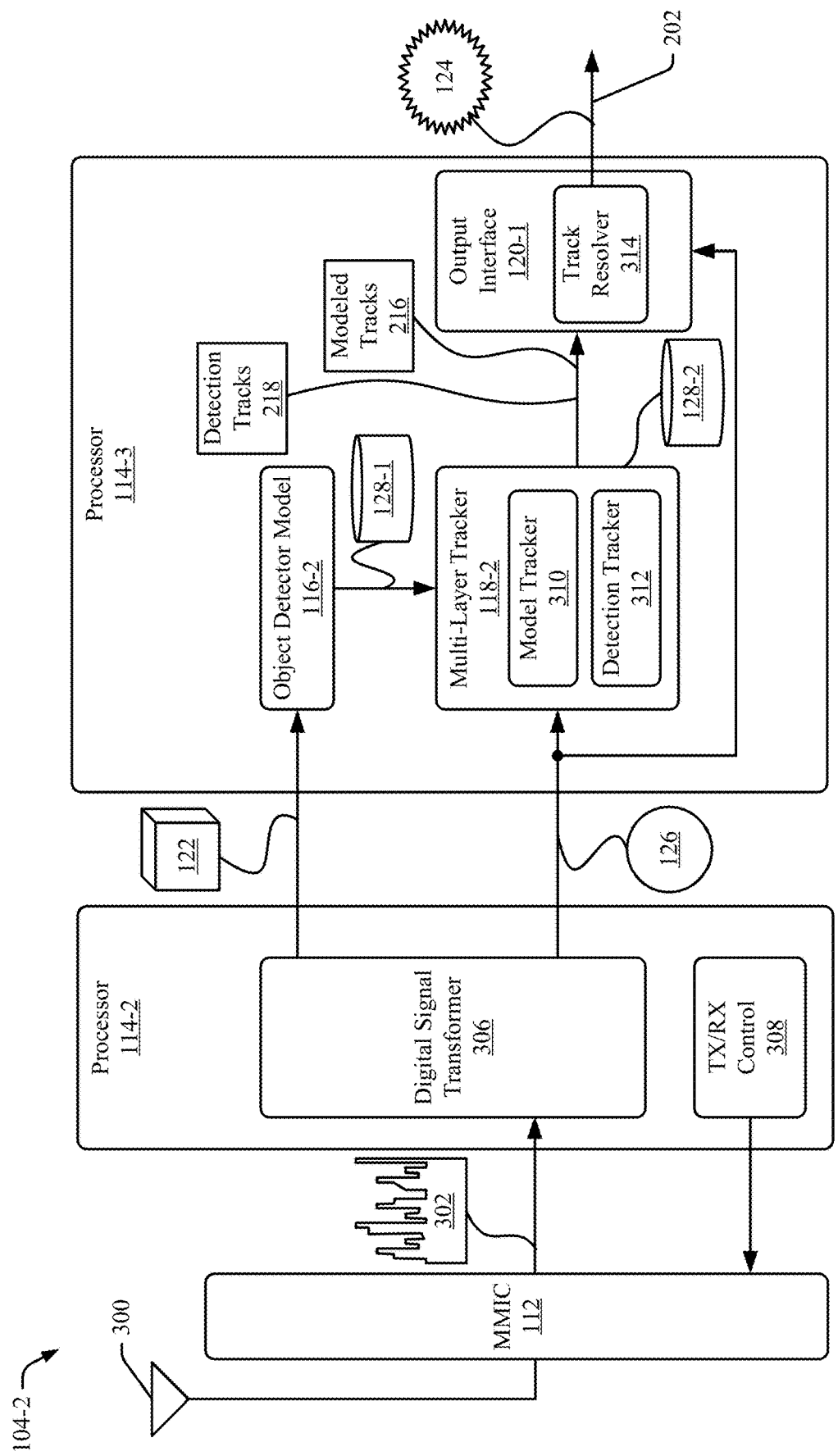
Figures 2, 3:
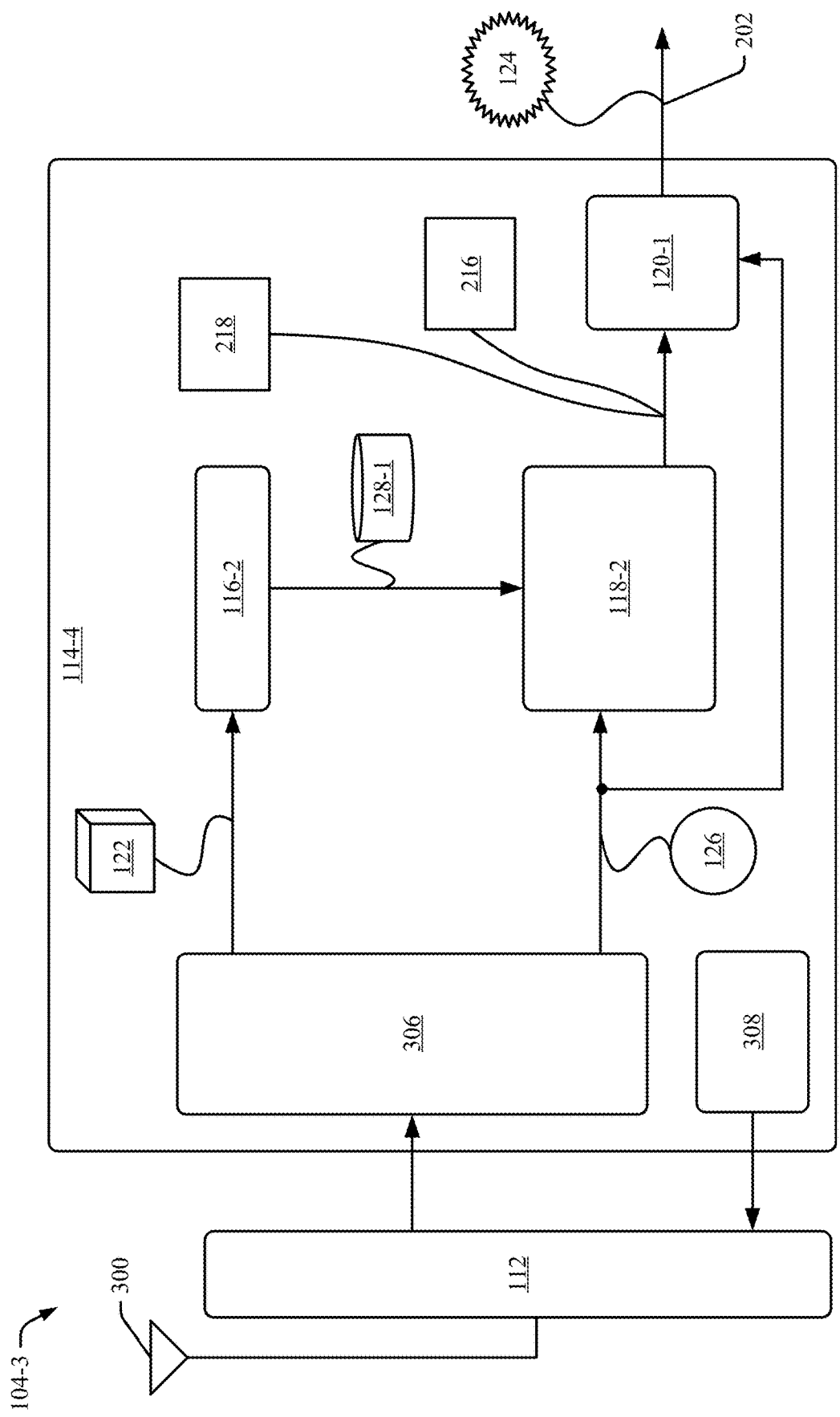
Figure 3:
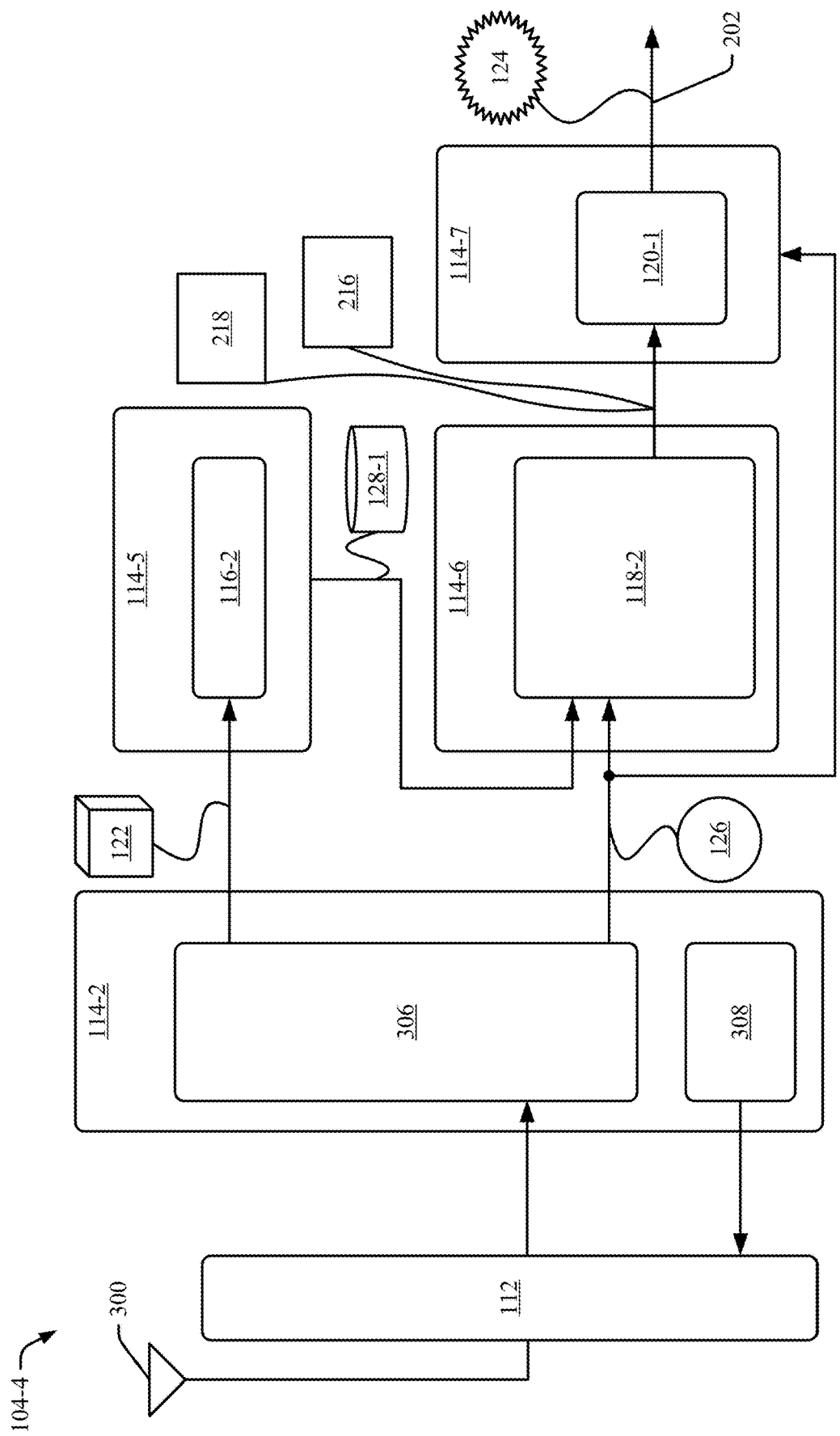
Figures 3, 4:
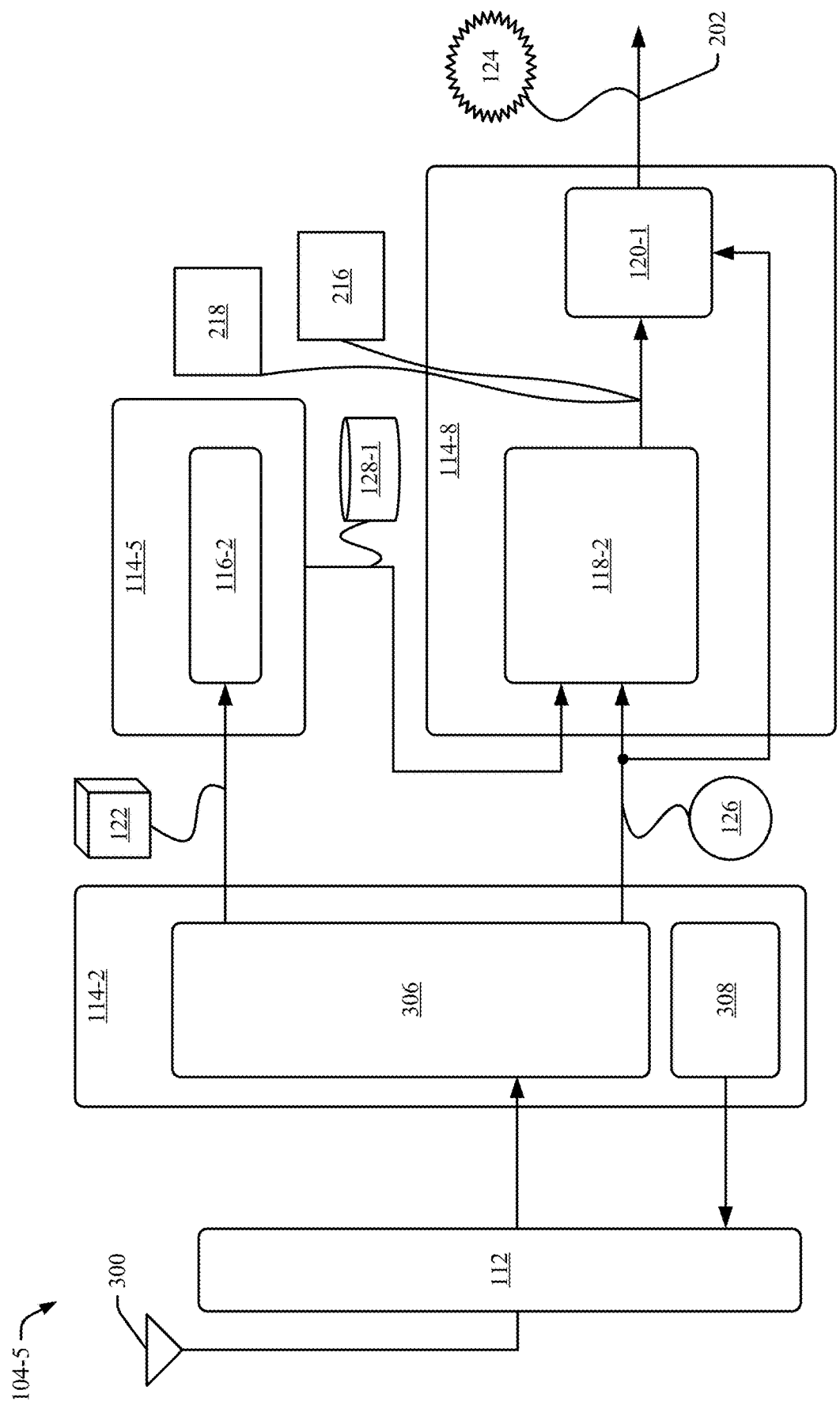
Figure 4:
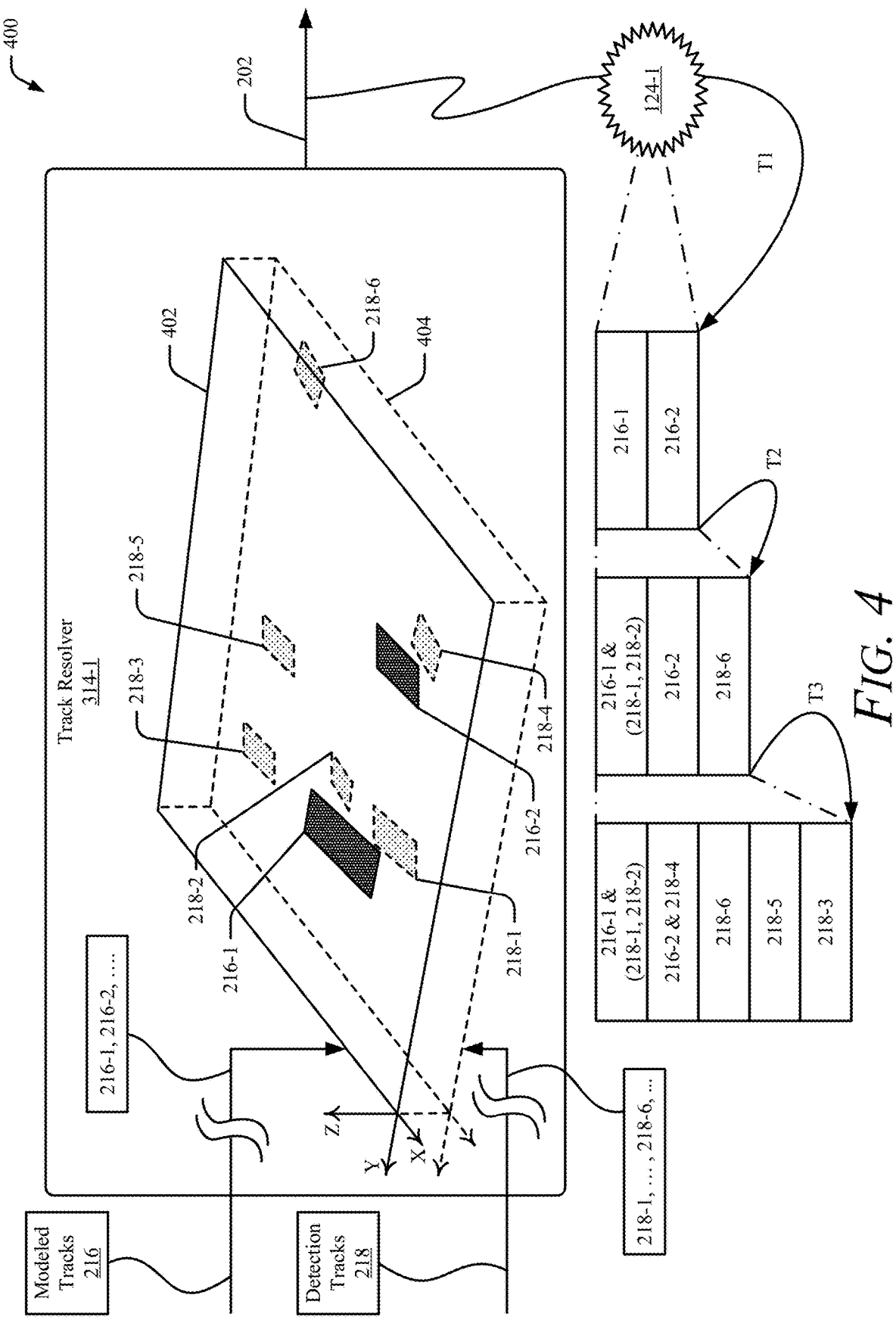

FIG. 3-1 to FIG. 3-4 illustrate further examples of systems configured to perform radar tracking with model estimates augmented by radar detections. The techniques described herein for augmenting modeled estimates using detections can be implemented using a variety of computer architectures, including using one or more processing components (e.g., the processor 114, the processor 114-1) distributed among multiple components or portions of a radar system circuitry. The radar systems shown in FIG. 3-1 to FIG. 3-4 include, respectively, radar system 104-2, radar system 104-3, radar system 104-4, and radar system 104-5, each of which are examples architectures for the radar system 104, and the radar system 104-1. The radar systems 104-2 through 104-5 implement same or similar functions as the radar system 104, and the radar system 104-1, using like-numbered components, some showing additional detail, being arranged in multiple ways to show different examples architectures.

The radar system 104-2 is a dual processor architecture, which in addition to an antenna 300 (e.g., an antenna array) and the MMIC 112, includes a processor 114-2 and a processor 114-3. The processors 114-2 and 114-3 are configured to execute the same or similar operations described with reference to the processor 114 and the processor 114-1, however, with more two processors, the radar system 104-2 can share or distribute execution of the operations between the two different processors 114-2 and 114-3, which may themselves be two different processor types.

The processor 114-2 is a radar processor that receives digitized radar returns 302, obtained from the MMIC 112 via the antenna 300, and uses the digital signal transformer 306 to generate the data cube 122 and the detections 126 with sufficient speed to enable a frame rate for enabling object recognition for driving. The processor 114-2 executes a digital signal transformer 306 and a TX/RX control component 308.

The TX/RX control component 308 may control the MMIC 112, to cause the MMIC 112 to transmit the radar signal 110-1 and receive the radar returns 110-2. The TX/RX control component 308 may specify a frequency, a frame rate, gain, or any other parameter or input to enable the MMIC 112 to output the radar signal 110-1 and receive the radar returns 110-2 for each frame.

The digital signal transformer 306 may transform the digitized radar returns 302 into the data cube 122 and into the detections 126 using known radar processing techniques. For example, some of the digitized radar returns 302 may undergo fast time processing and others slow time processing that may eventually undergo integration and thresholding as described above for representing the transformed digitized radar returns 302 into the data cube 122 representation that can be evaluated for tracking. The detections 126 can be generated from the digital signal transformer 306 performing peak estimation and detection techniques, including direction of arrival computations. For each frame of the digitized radar returns 302, the digital signal transformer 306 can cause the processor 114-2 to output the detections 126 and the data cube 122.

The processor 114-3 is different than the processor 114-2 and may be considered a domain controller. As a domain controller, the processor 114-3 can perform many functions, including at least being configured to generate the tracks 124 based on model estimates derived from the data cube 122 and in some cases, augmented by the detections 126. Other functions of the domain controller may be possible, including other operations performed based on the data cube 122, the detections 126, and/or the tracks 124. As some examples, the domain controller can execute tracking functions for performing conventional types of radar tracking including detection based radar tracking using the detections 126 alone, or model based radar tracking using the data cube 122, alone. Other types of object tracking can be managed by the domain controller. Multiple-sensor-type object tracking (e.g., sensor-fusion tracking) can be performed by the domain controller using aspects of the tracks 124 in combination with aspects of other tracks generated by other sensors, e.g., apart from using the detections 126, the data cube 122, or other radar data. In some cases, the domain controller executes operations for scene processing that may supplement object tracking functions to output information that conveys greater detail about the environment 100, including other objects than those associated with the tracks 124.

To perform radar tracking using model estimates augmented by detections, an object detector model 116-2, which is an example of the object detector model 116-1, obtains the data cube 122 and outputs the model based data objects 128-1 from relying on a model that is trained or programmed to estimate measurements for the model based data objects 128-1, from directly analysis of the data cube 122. The processor 114-3 may be a preferred type of processing component, such as a graphics processor unit (GPU), for executing a machine-learned model. The processor 114-3 may include multiple cores or execution pipelines, for example, to execute a model while simultaneously executing operations for other functions of the radar system 104-2, which are not already executing on the processor 114-2.

Then, a multi-layer tracker 118-2, which is an example of the multi-layer tracker 118-1, reports the detection tracks 218 and the modeled tracks 216 that can be inferred from the model based data objects 128-1 and from the detection based data objects 128-2 it generates from the detections 126. Included within the multi-layer tracker 118-2 is a model tracker 310 and a detection tracker 312.

The model tracker 310 is configured to process the model based data objects 128-1 obtained over multiple frames to derive the model tracks 216. The model tracker 310 is a radar tracker configured to generate the model tracks 216 based on an input of the data cube 122 it receives over time. It uses a model, which can be trained using machine learning or programmed in other ways, to directly estimate object measurements for certain classes of objects directly from the data cube 122. The model tracker 310 may fail to report some types of objects that the detection tracker 312 identifies directly from the detections 126 (as later explained). The output from the model tracker 310 includes at least one of the model tracks 216 that corresponds to each of the model based data objects 128-1.

The detection tracker 312 is a radar tracker configured to generate the detection tracks 218 from analyzing the detections 126 obtained over time. Usable groups of the detections 126 may be isolated from false or unusable groups of the detections 126, including the detections 126 that appear as noise, through processes called thresholding and non-maximal suppression of EM receive energy in one or more planes (e.g., a Range-Doppler plane, a Range-Angle plane, a Doppler-Angle plane) using techniques, such as peak-finding within the EM receive energy using specific isolation techniques for each plane. The output from the detection tracker 312 includes at least one of the detection tracks 218 that corresponds to at least one of the detection based data objects 128-2. The detection tracker 312 is configured to process the detections 126, over multiple frames, to derive the detection based data objects 128-2 that are used to form the detection tracks 218.

Lastly, the processor 114-3 executes an output interface 120-1, which is an example of the output interface 120. The output interface 120-1 includes a track resolver 314 configured to receive the detection tracks 218 and the modeled tracks 216 as inputs, and from the inputs, derive the tracks 124 that are output as radar data on the link 202. At least one of the tracks 124 is established for each of the modeled tracks 216. As the detection tracks 218 increase in consistency and/or accuracy over multiple frames, the track resolver 314 may augment the tracks 124 established initially, or the track resolver 314 may establish and add to the tracks 124, one or more new tracks based on the detection tracks 218. The detections 126 may be received as a further input used by the track resolver 314 in producing the tracks 124, the detections 126 may be obtained directly from the digital signal transformer 306, or inferred from the detection based data objects 128-2 or the detection tracks 218.

In contrast to FIG. 3-2, FIG. 3-2 shows a system on chip example architecture for implementing the techniques described herein, including the antenna 300, the MMIC 112, the digital signal transformer 306, the TX/RX control component 308, the object detector model 116-2, the multi-layer tracker 118-2, and the output interface 120-1 all on one processor or component. Rather than the dual processor architecture of the radar system 104-2, the radar system 104-3 includes a processor 114-4 referred to as a system on chip, encompassing functions of the processors 114-2 and 114-3. The processor 114-4 can include separate execution blocks, however, the detections 126, the data cube 122, and the tracks 124 are generated by a single logical block, chip, or integrated circuit.

FIG. 3-3 includes the radar system 104-4 and FIG. 3-4 shows the radar system 104-5, each of which demonstrate further examples of multi-processor architectures that can be used to implement the radar system 104-2, using more than just two processors. In the radar system 104-4, in addition to the processor 114-2, included are three separate processors 114-5, 114-6, and 114-7 in combination, instead of the processor 114-3. Likewise, in addition to the processor 114-2, the radar system 104-5 includes the processor 114-5 and a processor 114-8, instead of the processor 114-3 or the combination of the processors 114-5, 114-6, and 114-7.

Other architectures than those shown in and described with reference to FIGS. 3-1 to 3-4 are also possible, including architectures that involve additional or fewer components than what is shown. Each architecture can include a unique combination of processor types to implement the radar systems 104-2, 104-3, 104-4, and 104-5 to derive certain computing benefits (e.g., faster execution times, reporting the tracks 124 more quickly). Some types of processors are better than others at quickly processing certain data types or executing certain operation types. The specific type of processors used in the radar systems 104-2, 104-3, 104-4, and 104-5 may be uniquely suited for performing certain operations related to radar tracking using model estimates augmented with detections. The processors 114-2, 114-3, 114-4, 114-5, 114-6, 114-7, and 114-8, can include any type of processors used in combination to perform radar tracking in accordance with the described techniques.

Conception of Multiple-Layer Approach

FIG. 4 illustrates a system 400 configured to maintain multiple tracking layers in furtherance of radar tracking with model estimates augmented by radar detections. The system 400 represents a conceptual view of a track resolver 314-1, which is an example of the track resolver 314 from FIG. 3-1.

The track resolver 314-1 is configured to receive an input that includes the modeled tracks 216 and the detection tracks 218 (e.g., as provided by the multi-layer tracker 118-2) to derive a single set of tracks 124-1, as an example of the tracks 124 that are output on the link 202. The track resolver 314-1 relies on an overlay approach to managing the modeled tracks 216 and the detection tracks 218 including maintaining a foreground layer 402 for each of the modeled tracks 216 in addition to separately maintaining a background layer 404 for each of the detection tracks 218. The foreground layer 402 may also be referred to as a first tracking layer or primary tracking layer; likewise, the background layer 404 instead be described as a second tracking layer or secondary tracking layer. From observing alignments between portions of the detection tracks 218 on the background layer 404 and parts of the modeled tracks 216 on the foreground layer 402, the track resolver 314-1 can output the tracks 124-1 in a way that more accurately conveys objects in the environment 100, than can be conveyed from the modeled tracks 216 or the detection tracks 218, alone.

Generated from the modeled tracks 216, the foreground layer 402 includes a modeled track 216-1 and a modeled track 216-2 derived by the model tracker 310 (e.g., using tracking techniques applied by the model tracker 310 to position measurements of the model based data objects 128-1). These modeled tracks 216-1 and 216-2 benefit from high quality estimates of position, size, orientation, and object class being provided by the object detector model 116-2. In contrast to the foreground layer 402, the background layer 404 is generated from the detection tracks 218, which includes detection tracks 218-1 through 218-6 derived by the detection tracker 312 (e.g., using tracking techniques applied by the detection tracker 312 to position and range rate estimates of the detection based data objects 128-2). The background layer 404 is maintained separate from the foreground layer 402 such that none of the tracks 218-1 through 218-6 depend on the modeled tracks 216, or the model based data objects 128-1 that are output from the object detector model 116-2.

The track resolver 314-1 can enable the output interface 120-1 to execute a track down-selection scheme. In this regard, any of the detection tracks 218 maintained on the background layer 404, which correspond to one of the modeled tracks 216 maintained on the foreground layer 402, represents a track pair to the same object in the field of view 106. In other words, some of the modeled track 216 in the foreground layer 402 may obscure some of the detection tracks 218 to which it is paired in the background layer 404. The detection tracks 218 that are paired to one of the modeled tracks 216 are not output within the tracks 124-1. Instead, the detection tracks 218 are maintained in the background layer 404 until information derivable from the detection tracks 218 is of sufficient quality to be used to augment one of the modeled tracks 216 that is directed to a common object.

As can be shown in the time lapse change in the tracks 124-1 conveyed on the link 202 from time T1, to time T2, to time T3, the track resolver 314-1 enables the radar system 104 to track classes of model based data objects 128-1, recognized by the object detector model 116-2, that include high quality estimates about position, velocity, acceleration, yaw rate, trajectory curvature, size, orientation, and object class. By tracking using position measurements of the modeled tracks 216, good tracking may initially be achieved to convey at least some of the radar detectable objects in the field of view 106. At each subsequent time stamp, however, by evaluating the detection tracks 218 relative to the modeled tracks 216 at each time step, more-accurate detection based positions and range rates associated with the detection tracks 218 that align with a corresponding one of the modeled tracks 216, to quickly correct any errors in estimated velocity, acceleration, yaw rate, and curvature, conveyed previously in the tracks 124-1.

For example, turning to the tracks 124-1 shown at different time T1, T2, and T3. Initially, the track resolver 314-1 causes the tracks 124-1 to appear on the link 202 at time T1, including a track corresponding to each of the modeled tracks 216-1 and 216-2 of the foreground layer 402. These are high quality tracks conveying model estimates of object measurements derived from the model based data objects 128-1.

Subsequently, at time T2, the track resolver 314-1 causes the tracks 124-1 to be augmented, or updated, to appear differently on the link 202 at time T2 than at time T1. In some cases, the modeled tracks 216-1 and 216-2 can benefit from high quality positions and range rates of the detections 126 (e.g., for a quick enhancement of estimated velocity, yaw rate, trajectory curvature). For example, when any of the detection tracks 218 of the background layer 404 are in an accurate state and/or positionally aligned to one of the modeled tracks 216, they can be used to update object measurements conveyed in the modeled tracks 216-1 and 216-2. For example, this may include updating a velocity estimate using the more accurate information that can be derived from the detections 126. That is, while the tracks 124-1 at time T2 still include a track corresponding to each of the modeled tracks 216-1 and 216-2 of the foreground layer 402, the modeled track 216-1 is updated at time T2 to include a new velocity or other new information derived from the detection tracks 218-1 and 218-2, which positionally align to the modeled track 216-1. This is augmented version of the modeled track 216-1 is shown in FIG. 4 as one of the tracks 124-1 at time T2 that includes a label written in short-hand as "216-1 & (218-1, 218-2)", with the & representing an augmentation operation applied to a modeled track, as designated by a variable to the left of the &. The augmentation operation is dependent on information derived from one or more detection tracks, as designated by a series of variables on the right of the &.

Also shown in FIG. 4, after further time, at time T3, and after further radar data is collected by the radar system 104, the tracks 124-1 may subsequently appear on the link 202 with the modeled track 216-2 being updated to include a new velocity or other new information derived from the detection tracks 218-4, which positionally aligns to the modeled track 216-2. This, in addition to outputting the modeled track 216-1 having already been updated or further updated using information derived from the detection tracks 218-1 and 218-2. This is augmented version of the modeled track 216-2 is shown in FIG. 4 as one of the tracks 124-1 at time T3 that includes a label written in short-hand as "216-2 & 218-4".

Example Processes—Generally

Figure 5:
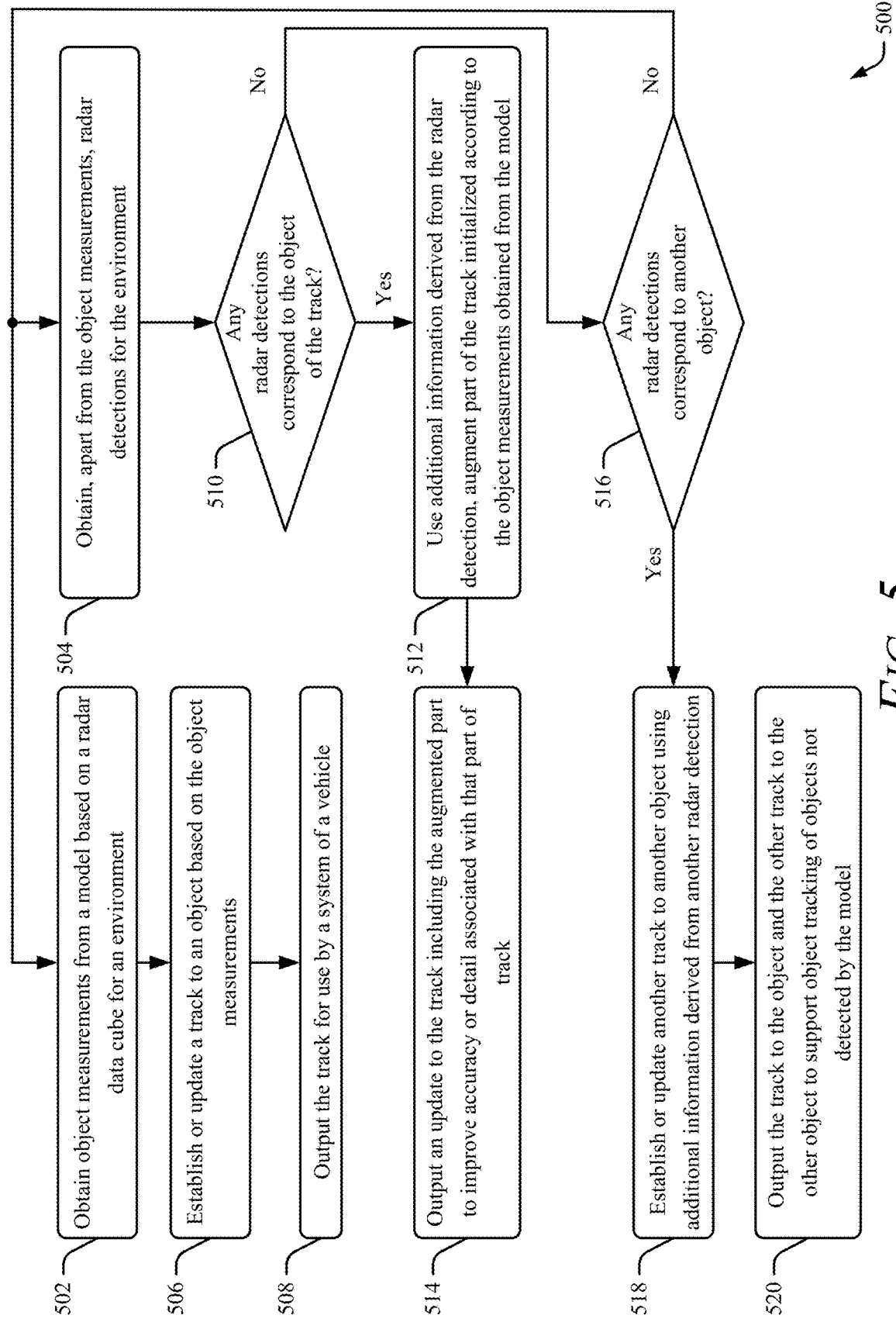
FIG. 5 illustrates a flow diagram of an example process for radar tracking with model estimates augmented by radar detections.

FIG. 5 illustrates a flow diagram of an example process 500 for radar tracking with model estimates augmented by radar detections. For ease of description, the process 500 is described primarily in the context of being performed by the radar systems 104, and various examples thereof, including the radar systems 104-1 to 104-6, including aspects of the track resolver 314-1 from FIG. 4. Operations (also referred to as steps) of the process 500 are numbered in this example from 502 to 520. However, this numbering does not necessarily imply a specific order of operations. The steps of the process 500 may be rearranged, skipped, repeated, or performed in different ways than the specific way it is shown in the diagram of FIG. 5.

At step 502 object measurements are obtained from a model based on a radar data cube for an environment, and at step 504, apart from the object measurements, detections for the environment are obtained. For example, the model based data objects 128-1 are generated by the object detector model 116-1 based on the radar data cube 122. The detections 126 are received by the multi-layer tracker 118-1, from which detection based data objects 128-2 are derived in a way that is separate from operations performed by the object detector model 116-1 in analyzing the data cube 122.

At 506, a track to an object is established or updated based on object measurements is estimated by the model. For example, the multi-layer tracker 118-1 generates the modeled tracks 216 to include a corresponding one of the modeled tracks 216, for each of the model based data objects 128-1. Each of the modeled tracks 216 can include numerous fields of information derived from the object measurements estimated by the object detector model 116-1 for a unique one of the model based data objects 128-1. In addition to establishing tracks, step 506 can include updating established tracks according to updated object measurements estimated by a model. For example, at each frame, the data cube 122 is input to the object detector model 116-1, which may cause an update of previously estimated object measurements, and cause the output interface 120-1 to perform an update to one or more fields of the tracks 124 established from the modeled tracks 216 received from prior frames. An example of step 506 is shown below with greater detail as step 506-1 in FIG. 6-1.

At 508, the track is output for use by a system of a vehicle. For example, the output interface 120-1 may receive the modeled tracks 216 and initially output each of the modeled tracks 216 as the set of tracks 124 that are sent to the vehicle-based systems 200 on the link 202.

At 510, whether any of the radar detections observed from the signals received from the environment corresponds to a same object as the track established using the information obtained from the model. In response to determining at least one radar detection corresponds to the same object as the track established using the information obtained from the model, then the Yes output from step 510 is followed to perform step 512. For any of the radar detections that remain, which do not correspond to the same object as the track established using the information obtained from the model, then the No output from step 510 is followed to perform step 516. An example of step 510 is shown below with greater detail as step 510-1 in FIG. 6-1.

For example, the multi-layer tracker 118-1 generates the detection tracks 218 to include one detection track for each of the detection based data objects 128-2 derived from the detections 126. Each of the detection tracks 218 can include information derived from the detections 126 for a unique one of the detection based data objects 128-2. In response to receiving the modeled tracks 216 and the detection tracks 218, the output interface 120-1 can determine whether any of the detection tracks 218 align with or correlate to objects of any of the modeled tracks 216. If a position of a subset of the detection tracks 218 corresponds to a position of an object conveyed in one of the modeled tracks 216, then that modeled track is deemed to be a candidate for augmentation using addition information contained in the corresponding subset of the detection tracks 218, at step 512. If, however, none of the detection tracks 218 correspond to a position of an object conveyed in one of the modeled tracks 216, then that modeled track is deemed not to be a candidate for augmentation using addition information contained in any of the detection tracks 218. The modeled track 216 can be updated in response to subsequent data cubes obtained At 512, in response to determining at least one radar detection corresponds to the same object as the track established using the information obtained from the model, additional information derived from the radar detection is used to augment at least part of the track initialized according to the object measurements obtained from the model to improve accuracy or detail associated with that part of track. For example, the track output at 508 can be augmented based on additional information conveyed in some of the detection tracks 218 that are aligned to that track, when at 512, it is determined that the track output at 508 is a candidate for augmentation. This can include adjusting or updating a direction, a speed, a velocity, a size, or other information estimated by the object detector model 116-1, apart from using the detections 126. An example of step 512 is shown below with greater detail as step 512-1 in FIG. 6-1.

At 514, an update to the track established or updated at step 508 is output, including conveyed in the update, the augmented part, thereby improving accuracy or detail associated with object tracking as compared to relying on estimates of measurements derived from model based data cube analysis, alone. In other words, the track established or updated using the information obtained from the object detector model 116-1 over one or more frames and occurrences of step 508 is output as one of the tracks 124, prior to step 512, in which augmentation of part of the track may occur. After the track is deemed a candidate for augmentation at step 510, the track is updated at step 512 to convey part of the differently than how that part of the track is conveyed in the tracks 124 prior to the augmentation.

Even if at 510, the radar system 104-1 determines that the detections 126 cannot be used to update a pre-existing track established from the modeled tracks 216, the detections 126 may be useful to the radar system 104-1 for conveying other aspects of the environment 100 that the object detector model 116-1 fails to recognize. With reference back to 510, for any of the radar detections that do not correspond to the same object as the track established using the information obtained from the model, the process 500 then follows the No output from step 510 to perform step 516.

At 516, whether any of the radar detections observed from the signals received from the environment correspond to another object, different than an object of the tracks established at 506 using the information obtained from the model. This can include determining whether another radar detection observed from the signals received from the environment corresponds to the same object as the track established using the information obtained from the model. For example, using the detection tracks 218 for each of the detection based data objects 128-2 derived from the detections 126, the output interface 120-1 can determine whether any additional information is derivable from the detections 126 and/or the detection tracks 218, apart from what the object detector model 116-1 observes from data cube analysis. The output interface 120-1 can resolve the detection tracks 218 with the modeled tracks 216 by updating one or more of the tracks 124 using this additional information, to improve accuracy of object measurements conveyed by the tracks 124 when compared to prior outputs of the tracks 124.

For cases where none of the radar detections or detection tracks 218 can be used to support radar tracking to another object, then the No output from step 516 is followed. For any of the detection tracks 218 or the detections 126 that are not of sufficient quality to support augmentation or object tracking themselves, the radar system 104-1 may retain the detection tracks 218, even if unused, for future consideration during subsequent frames or cycles of the process 500. This can include responsive to determining that the other radar detection observed from the signals received from the environment does not correspond to the same object as the track established using the information obtained from the model, refraining from, using additional information derived from the other radar detection to augment any part of the track that is initially set according to the object measurements obtained from the model.

However, at 516, in response to determining at least one radar detection corresponds to another object, then at 518 another track is established or updated using the additional information derived from the radar detection. That is, responsive to identifying at least one radar detection that corresponds to another object and that is not presently captured by the tracks 124, then the Yes output from step 516 is followed to perform step 518.

At 518, the output interface 120-1 may determine that one of the detection tracks 218, although unaligned with any of the modeled tracks 216, is of sufficient quality to be reported and tracked in the tracks 124. The output interface 120-1 may include a new track in the tracks 124, or update one of the tracks 124, which correspond to an object or class of object that is unreported by the object detector model 116-1, but otherwise observable from radar detections. An example of step 518 is shown below with greater detail as step 518-1 in FIG. 6-2.

At 520, an update to the tracks 124 on the link 202 occurs to include any combination of tracks that are: A) tracks established or updated at 508 based on object measurements estimated from the object detector model 116-1, B) tracks established or updated at 508, which are augmented using additional information from the detections 126 at 512, to improve accuracy or detail associated with parts of the tracks, or C) tracks established or updated at 518 based on additional information from the detections 126 that are not already unused to augment an existing one of the tracks 124. For example, the output interface 120-1 causes the tracks 124 to arrive at the vehicle systems 200 with improved accuracy over time. Initially, the tracks 124 are to objects recognizable to the object detector model 116-1. Overtime, the tracks 124 can be updated through detection based augmentation to update information in the tracks 124 and/or to convey classes of objects beyond just those that are recognizable to a data cube fed model.

Example Processes—Further Details

Figures 1, 6:
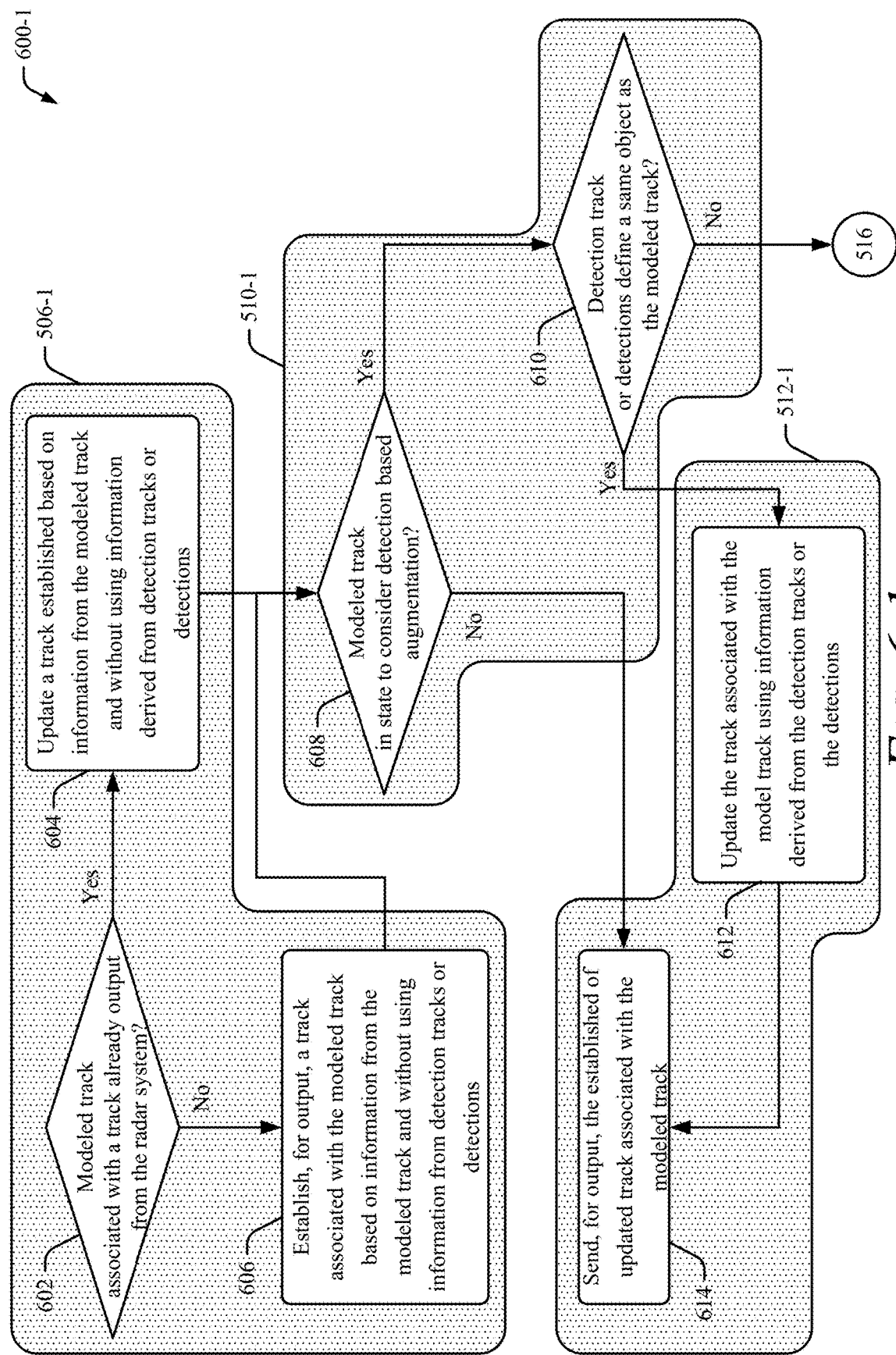
Figures 2, 6:
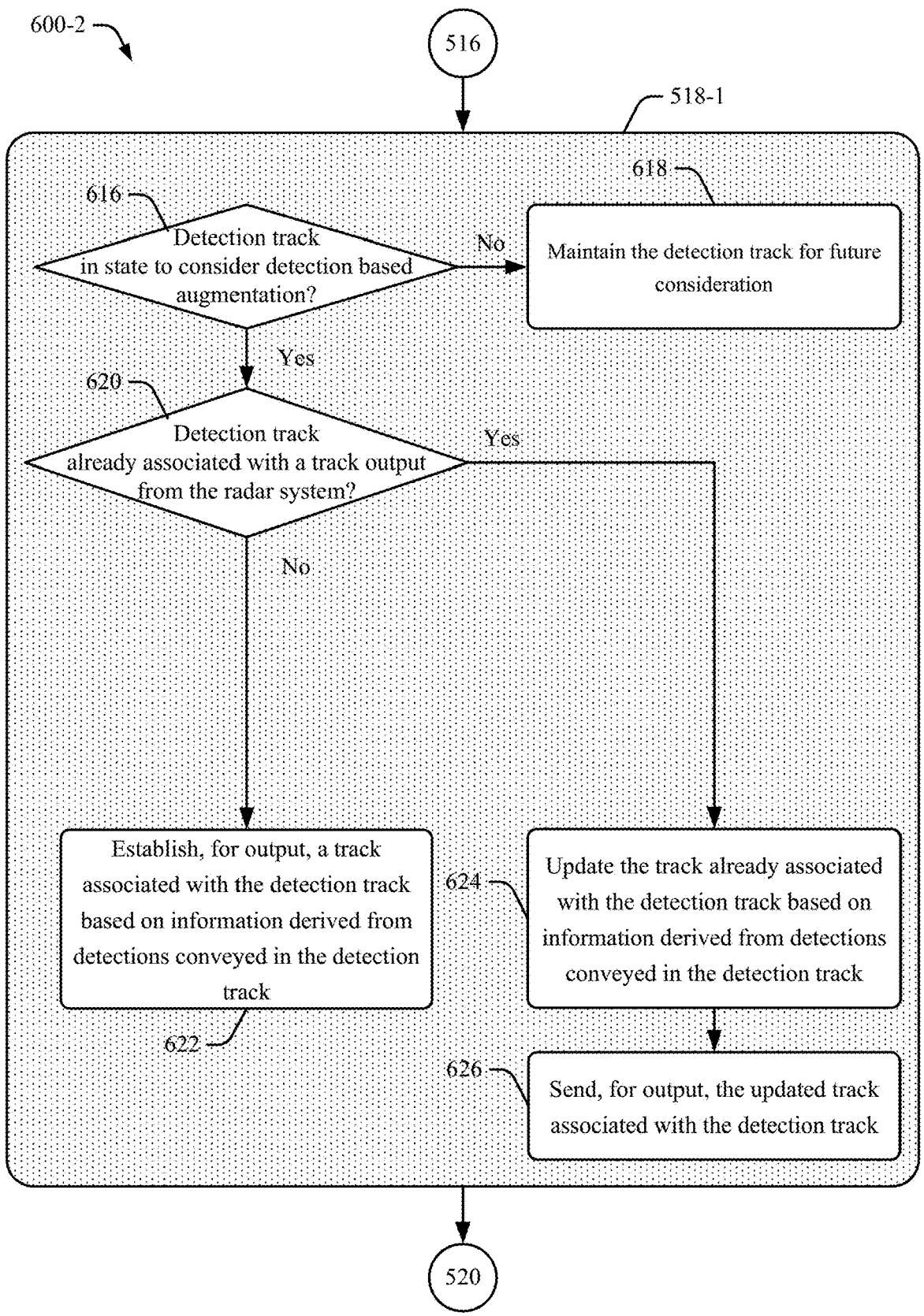

FIGS. 6-1 and 6-2 illustrate additional flow diagrams including example detailed portions of the process 500 of FIG. 5, or variant thereof, for radar tracking with model estimates augmented by radar detections. Process 600-1 is shown in FIG. 6-1 and includes the steps 506-1, 510-1, and 512-1. The process 600-1 is an example of augmenting the tracks 124, which initially are established to each of the modeled tracks 216 recognized by the object detector model 116-1, based on the detections 126 and/or the detection tracks 218. Complimenting the process 600-1, the process 600-2 includes the step 518-1, and provides another example of detection based augmentation of the tracks 124, this time to include additional tracks to objects that are unrecognizable to the object detector model 116-1 from the data cube 122.

Model Estimate Augmentation

Turning first to the step 506-1 of the process 600-1, steps 602, 604, and 606 may be performed to establish or update a track to an object based on object measurements obtained from a model (e.g., the object detector model 116-1). Execution of the process 600-1 may result in execution of step 516. That is, the modeled tracks 216 may be used by the track resolver 314 to update or establish the tracks 124 that the output interface 120-1 sends to the vehicle systems 200. To do this, at 602, it is determined whether each of the model tracks 216 is associated with any of the tracks 124 already established by or output from the radar system 104-1. If one of the modeled tracks 216 is already associated with one of the tracks 124 established previously, then the Yes branch from 602 flows to step 604. Alternatively, the No branch from 602 flows to step 606 in response to determining that none of the tracks 124 previously established corresponds to the same object as one of the modeled tracks 216.

At 604, one of the tracks 124 is updated based on a corresponding one of the modeled tracks 216 to the same object. This occurs without using information from the detection tracks 218 or the detections 126, but instead, relies on information output from the object detector model 116-1.

At 606, a new track to be added to the tracks 124 is established based on one of the modeled tracks 216 that is not already represented by the previously established tracks 124. Like step 604, step 606 occurs without using information from the detection tracks 218 or the detections 126, and instead, relies on information output from the object detector model 116-1 that is captured in the form of the model based data objects 128-1 and the modeled tracks 216.

For example, the track resolver 314 may fuse information contained in the model-based object measurements with the detections 126 or the detection tracks 218 using a track filter. The track filter may use a nearly Coordinated-Turn Constant-Acceleration (CTCA) motion model to model the dynamic behavior of the objects of the tracks 124. Any other appropriate track filter motion model, such as Cartesian Constant Acceleration, Coordinated Turn, etc., may be used to implement any appropriate track filter techniques, including Extended Kalman filtering, Unscented Kalman filtering, PHD filtering, particle filtering, etc. The track filter state variables can include X and Y position, heading, trajectory curvature, speed, and tangential acceleration and the like. The state variables may indicate a quality of part of a track established using information from the model. For example, initially the velocity or reported position may be less accurate but over time, the quality of the object measurement estimated from model based tracking may improve.

In some cases, establishing or updating one of the tracks 124 at 604 and 606 does not necessarily include outputting that tracks, until the object detector model 116-1 has processed sufficient frames of the data cube 122. During initialization, some of the tracks 124 are withheld from being output, and reported only after a period goes by; the quality of the tracks 124 improves overtime so when output to the vehicle system 200 on the link 202, they include accurate information. At the end of an interval, a curve-fitting procedure may be used to provide initial velocity estimates, for example, which may be used to initialize the track filter velocity states (or speed and heading states) that are used to report the tracks 124.

Turning next to step 510-1, with the tracks 124 based on the modeled tracks 216 established or updated, the process 600-1 flows out of the step 506-1 and into the step 510-1 to consider whether detection based augmentation is to be performed given. At this point, each of the tracks 124 ready for output are supported by modeled tracks 216 and modeled object measurements, e.g., position, direction, speed, size, alone. Before the detections 126 and/or the detection tracks 218 can be used to augment the object measurements of the tracks 124, object measurement states derived from the track filter, specifically velocity and related states, are analyzed for the tracks 124 to determine whether the tracks 124 contain information that is of sufficient accuracy for augmentation by additional information derivable from the detections 126 and/or the detection tracks 218.

The additional information derivable from the detections 126 and/or the detection tracks 218, which align with the tracks 124 established for each of the model tracks 216, can be used to augment or enhance the object measurements to improve the quality of the tracks. For instance, updating a velocity estimate based on the detections 126 or the detection tracks 218 can further improve the estimated velocity provided by the object detector model 116-1 and the track filter employed, which enables the radar system 104-1 to exceed any limit in accuracy of the track filter or the object detector model 116-1. This is particularly advantageous to improve responsiveness of the tracks 124 to convey accurate measurements even despite sudden maneuvers or turns.

There can be prevalent errors in velocity states managed by the track filter or reported from the object detector model 116-1. Sudden maneuvers by the vehicle 102, for instance, can take a while to be observable in modeled estimates of object measurements, such as a centroid of an object. Augmentation through detections can reduce this error in velocity states and other state related to the velocity (e.g., heading, curvature and acceleration), especially during these sudden maneuvers or turns by the vehicle 102 or objects being tracked. Therefore, before the additional information can be used to enhance the tracks 124, the tracks 124 may take multiple frames or loops (e.g., one time, two times, three times, four times, five times) before velocity states of the tracks 124 are stable, consistent, or otherwise of sufficient quality to be considered for detection-based enhancement.

Steps 608 and 610 of the step 510-1 may be performed to determine whether any radar detections or detection tracks correspond to the objects of any of the track 124 established or updated based on object measurements obtained from the model. The track resolver 314 or the track filter may consider the quality of the tracks 124 and the modeled tracks 216 to determine whether any are in a state for use in detection based augmentation.

At 608, whether a modeled track is in a state to consider detection based augmentation is determined. That is, part of the tracks 124 initialized according to the object measurements obtained from the object detector model 116-1 may be augmented or updated in response to determining that a quality of those parts of the tracks satisfies a quality threshold for performing detection based augmentation. For example, if one of the modeled tracks 216 or a corresponding one of the tracks 124 has a velocity state of sufficient quality to consider detection based augmentation, then the Yes branch from 608 flows to step 610. Alternatively, the No branch from 608 flows to step 614 in response to determining that the modeled tracks 216 or a corresponding one of the tracks 124 previously established is not on condition for augmentation (e.g., because a velocity state is not of sufficient quality to consider using detection based augmentation).

At 610, it is determined whether a detection track or detections define a same object as the modeled track that is in the state to consider augmentation. This includes determining whether another radar detection observed from the signals received from the environment corresponds to the same object as the track established using the information obtained from the model. For example, a range-rate gating procedure to deemphasize or eliminate from consideration in augmentation, the detections 126 and detection tracks 218 that have range-rates that deviate too far from the track filter states for that modeled track. If any of the detection tracks 218 or the detections 126 are reported at a position at or near one of the modeled track 216 that is in the state for augmentation, then the Yes branch of step 610 flows to step 612. Alternatively, the No branch from 612 flows to step 516 in response to determining that the modeled tracks 218 and the detections 126 do not define a same object as a modeled track that is in a state for augmentation.

The step 512-1 includes the steps 612 and 614. At the step 614, the tracks 124 that are established or updated without using the detections 126 and/or the detection tracks 218 are sent for output by the output interface 120-1 on the link 202. At the step 612, the tracks 124 established or updated based on the modeled tracks 216 that are in the state for augmentation are updated using information derived from the detection tracks 218 or the detections 126 that correspond. For example, heading, speed, velocity, range-rate, or other object measurements can be updated using detection based measurements of the same characteristics, which are more accurate over time than machine-learned model estimates. This way, a more complete set of radar detectable information associated with an object being tracked is used, instead of relying on just the data cube 122, or limited portion thereof being analyzed by the object detector model 116-1.

A result of performing the process 600-1 is that tracks output from a radar system can initially include a track established using information obtained from the model, prior to augmenting any part of that track to convey the additional information derived from radar detections to convey objects quickly. Then, that track be augmented using the information derived from radar detections to convey more accurate or updated object measurements (e.g., velocity related) than the model can estimate from data cubes alone.

Detection Tracking Augmentation

The process 600-2 of FIG. 6-2 demonstrates detection based radar tracking in combination with considering using radar detections for augmenting model based tracking. Also referred to as detection track enhancement, execution of the process 600-2 may occur in response to performance of step 516 and may result in execution of step 520. The track resolver 314 or the track filter may consider the quality of the detection tracks 218 and/or the detections 126 to determine whether any are in a state for use in detection based augmentation of the tracks 124, specifically, in a state to support a new track or an update to an existing track among the tracks 124 output from the radar system 104-1.

At 616, whether a detection track is in a state to consider detection based augmentation is determined. This can include, determining that a quality of the track established using the additional information derived from the radar detection satisfies a quality threshold for performing detection based augmentation. The quality of the track established using the additional information derived from the radar detection may initially be set below a quality threshold, and the quality of the track established using the additional information derived from the radar detection may increases as more of the radar detections 126 are received over frames or subsequent intervals.

For example, if any of the detection tracks 218 are reported at distant positions to the modeled tracks 216, they may not be used for augmentation of the modeled tracks 216, but instead, they may be used for supporting new tracks. Responsive to determining that a radar detection observed from the signals received from the environment does not correspond to the same object as a track established using information obtained from a model, step 616 is performed to determine whether to establish, using additional information derived from the radar detections and apart from using the information obtained from the model, another track to another object to support object tracking of additional objects than the model reports from the radar data cube.

The No branch from 616 flows to step 618 in response to determining that the detection tracks 218 are not yet in a state to consider using them for detection based augmentation. At 618, the detection tracks 218 not yet ready for object tracking are maintained for future consideration. In some examples, an estimate of a degree of velocity and velocity dependent state uncertainty are maintained. Alternatively, if any of the detection tracks 218 are in a state to consider detection based augmentation, then the Yes branch of step 616 flows to step 620. When aa detection track passes a check at step 616, any subsequent check of that detection track during a subsequent performance of the step 616 can be skipped or allow that detection track, which has already proven to be of sufficient quality, to automatically be considered for detection based augmentation at step 620, if that detection track exists.

In some examples, steps 616 and 618 may repeat for an interval of time (e.g., several frames, multiple seconds) for a curve-fitting procedure before any of the detection tracks 218 include object measurements (e.g., velocity states) that are stable and accurate for supporting object tracking and able to flow out the Yes branch from 616 to 620. During this interval, position measurements (e.g., velocity, velocity states) associated with the detection tracks 218 settle to a sufficient quality or consistent value to be considered for object tracking.

Rather than repeating for an interval of time for the curve-fitting procedure, and rather than using a fixed number of tracker loops, uncertainty based decisions may be executed. For example, the detection tracks 218 that are certain to track an object not represented by the tracks 124, can be queued for output to the vehicle based systems 200 while the tracks 124 supported by modeled tracks 216 are also being output. The tracks 124 can quickly convey not only the objects associated with the modeled tracks 216, but also other objects represented by any of the tracks 124 that are detection based. This enables, as many radar detectable objects as possible within a field of view can be tracked and reported with minimal latency.

At 620, whether a detection track is already associated with a track output from the radar system. For example, if a detection track is of sufficient quality to support object tracking, the track resolver 314 may promote that detection track to be one of the tracks 124 that is output by the radar system 104-1. The detection track may be used to establish a new track at 622 if at 620 the No branch is taken, and the detection track may be used at step 624 and 626 to send for output an update to an existing one of the tracks 124 that is detection based.

At 622, a track is established for output using information derived from radar detections. At 624, a track is updated using information derived from radar detections before being sent for output at 626 to be output among the tracks 124.

The track established for output at 622 or sent for output at 626 may be classified within object class that is different than any object class recognized by the model. The track may therefore be of an object class that is different than an object class of any of the tracks established using the information obtained from the model. Said differently, the model (e.g., the object detector model 116-1) may be unable to recognize, from the data cube 122, any objects outside a specific class or classes. Therefore, tracks established at the step 622 are to object classes that are different than the particular object classes of the tracks established using the information obtained from the model.

A result of performing the process 600-2 in combination with the process 600-1 is that tracks output from a radar system can include tracks established using information obtained from the model, in addition to some tracks having parts augmented by radar detections, in addition to other tracks established using the radar detections alone. In this way, most if not all classes of radar detectable objects are trackable, not just classes that the model is unable to recognize from the data cube.

Multi-Layer Object Tracking

Figure 7:
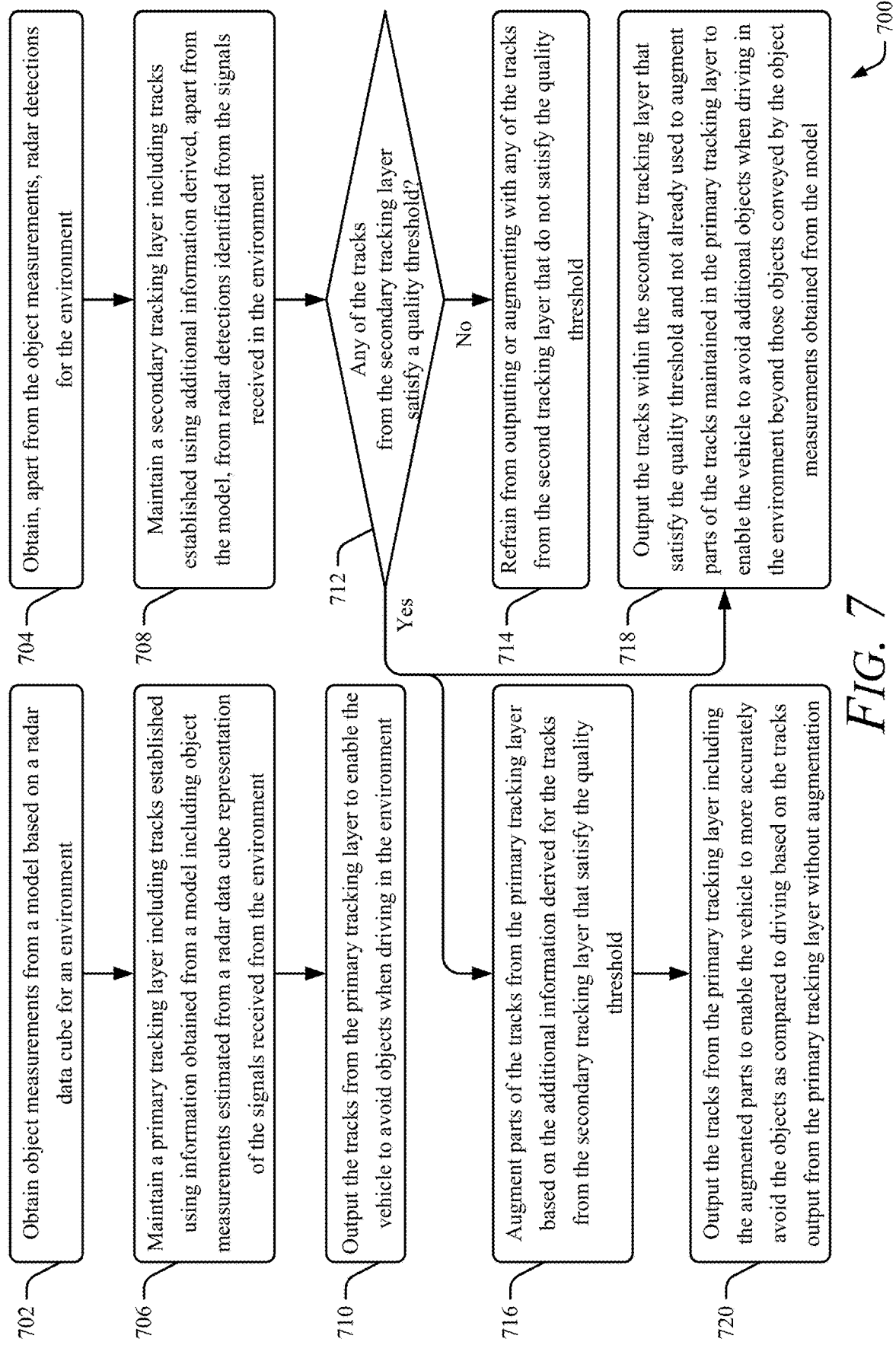
FIG. 7 illustrates a flow diagram of an example process for maintaining multiple tracking layers in furtherance of radar tracking, such as to support radar tracking with model estimates augmented by radar detections.

FIG. 7 illustrates a flow diagram of an example process for maintaining multiple tracking layers in furtherance of radar tracking, such as to support radar tracking with model estimates augmented by radar detections. For ease of description, the process 700 is described primarily in the context of being performed by the radar systems 104, and various examples thereof, including the radar systems 104-1 to 104-6, including aspects of the track resolver 314-1 from FIG. 4. Operations (also referred to as steps) of the process 700 are numbered in this example from 702 to 720. However, this numbering does not necessarily imply a specific order of operations. The steps of the process 700 may be rearranged, skipped, repeated, or performed in different ways than the specific way it is shown in the diagram of FIG. 7.

At 702, object measurements are obtained from a model based on a radar data cube for an environment. At 704, apart from the object measurements, radar detections for the environment are obtained. At 706, a primary tracking layer is maintained using the information obtained from the model. The primary tracking layer includes tracks to objects having been established using the information obtained from the model. At 708, a secondary tracking layer is maintained using the additional information derived from the radar detections. The secondary tracking layer includes tracks to objects having been established using additional information derived from any other radar detections, and apart from using the information obtained from the model.

In performing steps 706 and 708, the primary tracking layer and the secondary tracking layer may be maintained by assigning an identifier to each track in the primary tracking layer that is unique to an identifier assigned to each track in the secondary tracking layer. In this way, there are two sets of track identifiers, one for the primary and one for the secondary layer, which may facilitate organization and resolution into the single set of the tracks 124.

At 710 the tracks from the primary tracking layer are output to enable a vehicle to avoid objects when driving in the environment. That is, prior to augmenting a track established using the information obtained from the model, any tracks maintained in the secondary tracking layer are refrained from being output. However, each track maintained in the primary tracking layer is output.

At 712, whether any of the tracks of the secondary tracking layer satisfy a quality threshold to support tracking or augmentation is determined. For example, it is determined whether a detection track is of sufficient quality to support object tracking or augmentation. In response to determining that a track in the secondary layer is of sufficient quality, the Yes branch from step 712 to steps 716 and/or 718 is followed. In response to determining that a track in the secondary layer is not sufficient quality, the No branch from step 712 to step 714 is followed.

At step 714, the track resolver 314 may refrain from outputting or augmenting the tracks 124 using any of the tracks from the secondary tracking layer that are not of sufficient quality.

At step 716, the track resolver 314 may augment parts of the tracks from the primary tracking layer using the additional information derivable from quality detection tracks on the secondary tracking layer. In some examples, by promoting a track from the secondary tracking layer to the primary tracking layer to support augmentation of an existing track in the primary tracking layer, the identifier for the track established using the additional information derived from the radar detection that is maintained in the secondary tracking layer may be unassigned. This unassigning the identifier may eliminate that object from consideration as separate from the objects of the primary tracking layer. An unassigned identifier can be applied to a new track maintained in the primary tracking layer or a new track maintained in the secondary tracking layer.

At step 718, the track resolver 314 may promote a detection track to be one of the tracks 124 that is output by the radar system 104-1 and thereafter, included in the primary tracking layer. This may include, responsive to augmenting the track to the object established using the information obtained from the model, removing, from the secondary tracking layer, the track established using the additional information derived from the other radar detection. The detection track may be used to establish a new track at 718 if the detection track cannot be used at step 716 to augment parts of the tracks from the primary tracking layer, and in such a case, may be promoted to the primary tracking layer. From performing step 718, the tracks 124 convey additional objects to avoid when driving in the environment beyond those objects conveyed by the object measurements obtained from the model.

At 720, a track is established for output using information derived from radar detections. At 624, a track is updated using information derived from radar detections before being sent for output at 626 to be output among the tracks 124. This may include outputting the tracks from the primary tracking layer including the augmented parts to enable the vehicle to avoid the objects more accurately as compared to driving based on the tracks output from the primary tracking layer without augmentation.

From performing the process 700, a radar system can maintain two layers or sets of tracks that when resolved intelligently and methodically according to the described techniques, can convey highly accurate track representations of an environment, without latency. This is done by utilizing high-performance and fast object recognition performed from some machine-learned models, alongside detection based object tracking techniques to provide a more accurate and higher fidelity representation of a radar system field of view. With a more accurate representation of an environment, vehicle subsystems can make safer driving decisions to lead to more comfortable and safer experiences for occupants, other vehicles, and other people or objects that share a road.

A result of the process 700 may be for the radar system 104 to output, for use in operating the vehicle 102 in the environment 100, a stream of the tracks 124 that includes each of the tracks from the primary tracking layer and at least one other track from the secondary tracking layer that does not correspond to an object of any of the tracks output from the primary tracking layer.

Example Use Case

Figure 8:
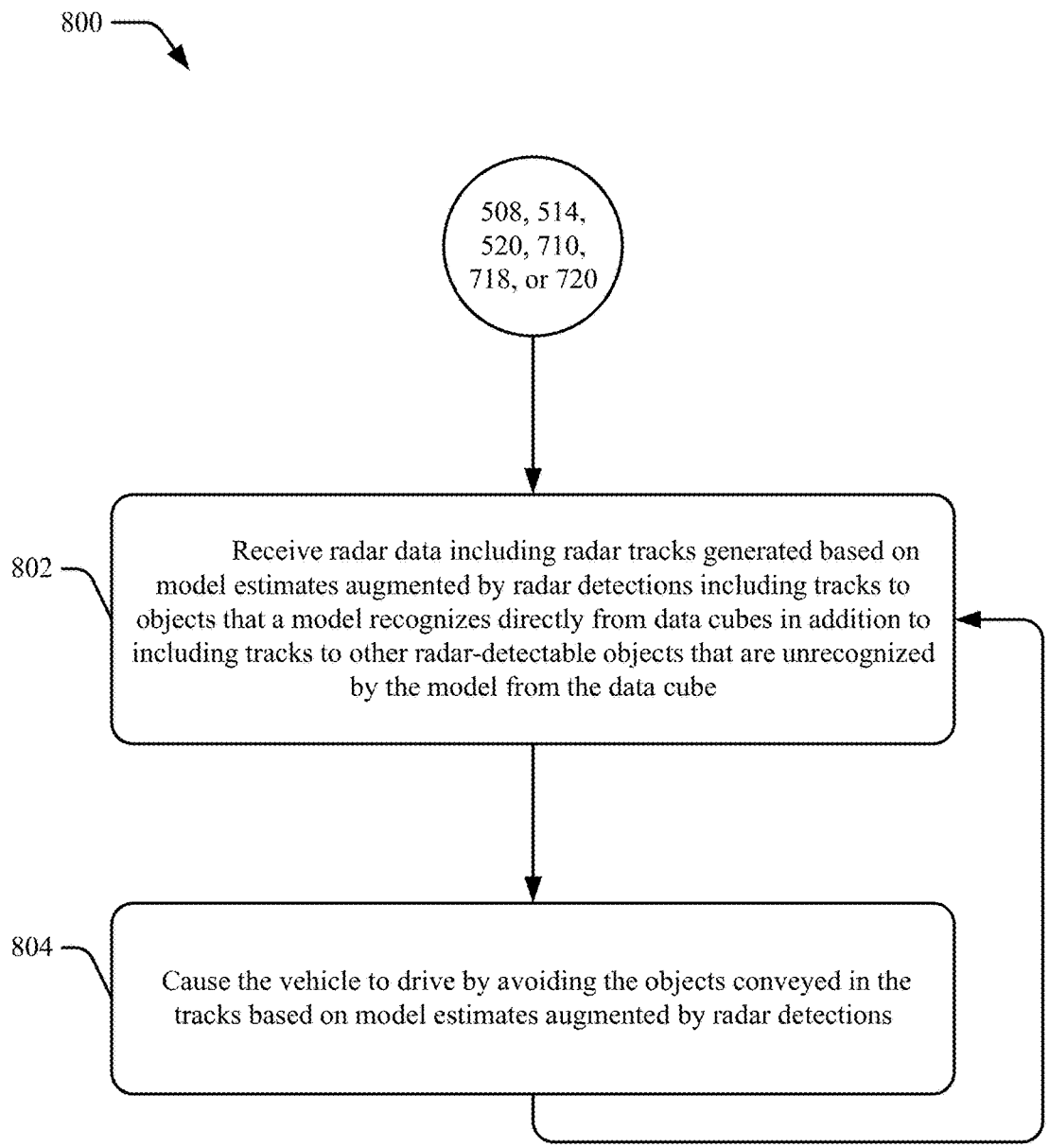
FIG. 8 illustrates a flow diagram of an example process for operating a vehicle using radar tracking with model estimates augmented by radar detections.

FIG. 8 illustrates a flow diagram of an example process 800 for operating a vehicle using radar tracking with model estimates augmented by radar detections. For ease of description, the process 800 is described primarily in the context of being performed by the vehicle based systems 200 of FIG. 2, for example, in furtherance of the radar system 104-1 performing the processes 500, 600-1, 600-2, and/or 700. Other devices and systems that are recipients of radar data to track objects in an environment may perform the process 800, as well. The operations of the process 800 may be rearranged, skipped, repeated, or performed in different ways than the specific flow shown in the diagram.

At 802, radar data including radar tracks is received. The radar tracks are generated based on model estimates augmented by radar detections including tracks to objects that a model recognizes directly from data cubes in addition to including tracks to other radar-detectable objects that are unrecognized by the model from the data cube. For example, the vehicle-based systems 200 may receive the tracks 124 being output from the radar system 104-1. Within the tracks 124, by the output interface 120-1 conveys objects associated with each of the modeled tracks 216, in some cases, augmenting fields of information based on one or more corresponding detection tracks 218. The output interface 120-1 may further output within the tracks 124 one or more tracks to objects corresponding to any of the detection tracks 218 that can, alone or in combination, be tracked as a radar detectable object that is undetectable to the object detector model 116-1.

At 804, a vehicle is caused to drive by avoiding the objects conveyed in the radar tracks. For instance, the tracks 124 can be processed by the vehicle-based systems 200 to cause the vehicle 102-1 to perform a driving maneuver and avoid objects in the environment 100 as they are reported in the tracks 124. The tracks 124 may indicate object size, object class, velocity, position, range-rate, etc., not only for classes of objects that are detectable to the object detector model 116, but also, additional radar detectable objects unreported by the object detector model 116 but nevertheless, inferable from the detections 126. Even if the tracks 124 are to one or more of the objects estimated by the object detector model 116-1, the tracks 124 may include updates or more accurate measurements for some properties by deriving more accurate estimates (e.g., velocity) from the parts of the data cube 122 that the object detector model 116-1 otherwise ignores.

CONCLUSION

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the scope of the disclosure as defined by the following claims. In addition to radar systems, problems associated with object recognition can occur in other systems (e.g., image systems, lidar systems, ultrasonic systems) that identify and process tracks from a variety of sensors. Therefore, although described to improve radar tracking, the techniques of the foregoing description can be adapted and applied to other problems to effectively detect and track objects in a scene using other types of object trackers.

The use of "or" and grammatically related terms indicates non-exclusive alternatives without limitation unless the context clearly dictates otherwise. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

We claim:

1. A method, comprising:
    establishing, by a radar system, a track to an object in an environment using information obtained from a model, the information obtained from the model including object measurements estimated from a radar data cube representation of signals received from the environment;
    determining, apart from the information obtained from the model, whether a radar detection observed from the signals received from the environment corresponds to a same object as the track established using the information obtained from the model;

responsive to determining that the radar detection corresponds to the same object as the track established using the information obtained from the model, augmenting, using additional information derived from the radar detection, part of the track initialized according to the object measurements obtained from the model to improve accuracy or detail associated with that part of track;
determining whether another radar detection observed from the signals received from the environment corresponds to the same object as the track established using the information obtained from the model; and
responsive to determining that the other radar detection observed from the signals received from the environment does not correspond to the same object as the track established using the information obtained from the model, establishing, apart from using the information obtained from the model, another track to another object using additional information derived from the other radar detection to support object tracking of additional objects than the model reports in response to an analysis the radar data cube.

2. The method of claim 1, further comprising:
outputting the track established using the information obtained from the model prior to augmenting the part of the track; and
updating the track output to convey the part of the track augmented using the additional information derived from the radar detection.

3. The method of claim 1, further comprising:
outputting the track established using the information obtained from the model prior to augmenting the part of the track to convey the part of the track using the additional information derived from the radar detection; and
outputting the other track established using the information derived from the other radar detection to convey objects of additional objects classes that the model is unable to recognize from the data cube.

4. The method of claim 1, wherein the object of the track established using the information obtained from the model corresponds to a particular object class, and the other object of the other track established using the information derived from the other radar detection corresponds to a different object class than the particular object class of the object of the track established using the information obtained from the model.

5. The method of claim 4, wherein the model is unable to recognize, from the radar data cube, any objects that correspond to object classes that are different than the particular object class of the object of the track established using the information obtained from the model.

6. The method of claim 1, wherein augmenting the part of the track initialized according to the object measurements obtained from the model to improve accuracy or detail associated with that part of track is further in response to determining that a quality of the track established using the additional information derived from the radar detection satisfies a quality threshold for performing detection based augmentation.

7. The method of claim 6, wherein the quality of the track established using the additional information derived from the radar detection is initially set below the quality threshold, and the quality of the track established using the additional information derived from the radar detection increases as more signals are received the radar detection.

8. The method of claim 6, further comprising:
determining a quality of the part of the track established using the information from the model; and
augmenting the part of the track initialized according to the object measurements obtained from the model in response to determining that the quality of the part of the track satisfies another quality threshold for performing detection based augmentation.

9. The method of claim 1, further comprising:
maintaining a primary tracking layer using the information obtained from the model, the primary tracking layer including the track to the object established using the information obtained from the model in addition to any other tracks established using the information obtained from the model; and
maintaining a secondary tracking layer using the additional information derived from the radar detection, the additional information derived from the other radar detection, and additional information derived from any other radar detections apart from using the information obtained from the model, the secondary tracking layer including a track established using the additional information derived from the radar detection, the other track established using the additional information derived from the other radar detection, and any other tracks established using additional information derived from any other radar detections.

10. The method of claim 9, further comprising:
prior to augmenting the track to the object established using the information obtained from the model, refraining from outputting any tracks maintained in the secondary tracking layer while outputting each track maintained in the primary tracking layer.

11. The method of claim 9, further comprising:
responsive to augmenting the track to the object established using the information obtained from the model, removing, from the secondary tracking layer, the track established using the additional information derived from the other radar detection.

12. The method of claim 9, further comprising:
output, for use in operating a vehicle in the environment, a stream of tracks that includes each of the tracks from the primary tracking layer and at least one other track from the secondary tracking layer that does not correspond to an object of any of the tracks output from the primary tracking layer.

13. The method of claim 9, wherein maintaining the primary tracking layer and maintaining the secondary tracking layer comprises assigning an identifier to each track in the primary tracking layer that is unique to an identifier assigned to each track in the secondary tracking layer.

14. The method of claim 13, wherein maintaining the primary tracking layer and maintaining the secondary tracking layer comprises unassigning the identifier for the track established using the additional information derived from the radar detection that is maintained in the secondary tracking layer to allow the unassigned identifier to be applied to a new track maintained in the primary tracking layer or a new track maintained in the secondary tracking layer.

15. A method comprising:
tracking, using a combination of a model based radar tracker and a detection based radar tracker, objects in an environment of a vehicle based on signals received form the environment, the tracking including:
maintaining a primary tracking layer including tracks established using information obtained from a model including object measurements estimated from a radar data cube representation of the signals received from the environment; and maintaining a secondary tracking layer including tracks established using additional information derived, apart from the model, from radar detections identified from the signals received in the environment; and refraining from outputting any of the tracks from the second tracking layer until the additional information derived from radar detections satisfies a quality threshold for performing detection based augmentation of parts of the tracks in the primary tracking layer, outputting the tracks in the primary tracking layer to enable the vehicle to avoid the objects when driving in the environment.

16. The method of claim 15, further comprising:

responsive to determining the additional information derived from radar detections satisfies the quality threshold for performing detection based augmentation of parts of the tracks in the primary tracking layer, augmenting, using the additional information derived from the radar detections, part of a track in the primary layer to improve accuracy or detail associated with that part of track, the part of the track in the primary layer being improved over an initial setting based according to the object measurements obtained from the model.

17. A radar system comprising at least one processor configured to:

establish a track to an object in an environment using information obtained from a model, the information obtained from the model including object measurements estimated from a radar data cube representation of signals received from the environment;

determine, apart from the information obtained from the model, whether a radar detection observed from the signals received from the environment corresponds to a same object as the track established using the information obtained from the model;

responsive to determining that the radar detection corresponds to the same object as the track established using the information obtained from the model, augment, using additional information derived from the radar detection, part of the track initialized according to the object measurements obtained from the model to improve accuracy or detail associated with that part of track;

determine whether another radar detection observed from the signals received from the environment corresponds to the same object as the track established using the information obtained from the model; and responsive to determining that the other radar detection observed from the signals received from the environment does not correspond to the same object as the track established using the information obtained from the model, establish, apart from using the information obtained from the model, another track to another object using additional information derived from the other radar detection to support object tracking of additional objects than the model reports in response to an analysis the radar data cube.

18. The radar system of claim 17, wherein the at least one processor is further configured to:

maintain a primary tracking including the track to the object established using the information obtained from the model in addition to any other tracks established using the information obtained from the model;

maintain a secondary tracking layer including a track established using the additional information derived from the radar detection in addition to any other tracks established using additional information obtained from any other radar detections and apart from the model;

further responsive to determining that the radar detection corresponds to the same object as the track established using the information obtained from the model, removing, from the secondary tracking layer, the track established using the additional information derived from the radar detection; and output, for use in operating a vehicle in the environment, radar tracks that include each of the tracks from the primary tracking layer and at least one other track from the secondary tracking layer that does not correspond to any of the tracks output from the primary tracking layer.

19. A method, comprising:

establishing, by a radar system, a track to an object in an environment using information obtained from a model, the information obtained from the model including object measurements estimated from a radar data cube representation of signals received from the environment;

determining, apart from the information obtained from the model, whether a radar detection observed from the signals received from the environment corresponds to a same object as the track established using the information obtained from the model;

responsive to determining that the radar detection corresponds to the same object as the track established using the information obtained from the model, augmenting, using additional information derived from the radar detection, part of the track initialized according to the object measurements obtained from the model to improve accuracy or detail associated with that part of track;

determining whether another radar detection observed from the signals received from the environment corresponds to the same object as the track established using the information obtained from the model; and responsive to determining that the other radar detection observed from the signals received from the environment does not correspond to the same object as the track established using the information obtained from the model, refraining from, using additional information derived from the other radar detection to augment any part of the track that is initially set according to the object measurements obtained from the model.

* * * * *